(12) United States Patent
Johansson et al.

(10) Patent No.: US 8,854,475 B2
(45) Date of Patent: Oct. 7, 2014

(54) SYSTEM AND METHOD FOR SENSOR FAILURE DETECTION

(71) Applicant: OmniVision Technologies, Inc., Santa Clara, CA (US)

(72) Inventors: Robert Johansson, Oslo (NO); Tore Martinussen, Strommen (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 2 days.

(21) Appl. No.: 13/763,562

(22) Filed: Feb. 8, 2013

(65) Prior Publication Data

US 2014/0226027 A1      Aug. 14, 2014

Related U.S. Application Data

(62) Division of application No. 13/763,498, filed on Feb. 8, 2013, now Pat. No. 8,736,684.

(51) Int. Cl.
*H04N 17/00* (2006.01)

(52) U.S. Cl.
CPC .................................. *H04N 17/002* (2013.01)

USPC ............ 348/187; 348/189; 348/180; 348/181

(58) Field of Classification Search
CPC ............................... H04N 17/00; H04N 5/367
USPC .................................. 348/187, 189, 180, 181
See application file for complete search history.

(56) References Cited

U.S. PATENT DOCUMENTS

2013/0083204 A1*    4/2013    Solhusvik et al. ............ 348/187

\* cited by examiner

*Primary Examiner* — Jefferey Harold
*Assistant Examiner* — Jean W Desir
(74) *Attorney, Agent, or Firm* — Larry E. Henneman, Jr.; Gregory P. Gibson; Henneman & Associates, PLC

(57) ABSTRACT

A novel image sensor includes a pixel array, a row control circuit, a test signal injection circuit, a sampling circuit, an image processing circuit, a comparison circuit, and a control circuit. In a particular embodiment, the test signal injection circuit injects test signals into the pixel array, the sampling circuit acquires pixel data from the pixel array, and the comparison circuit compares the pixel data with the test signals. If the pixel data does not correspond to the test signals, the comparison circuit outputs an error signal. Additional comparison circuits are provided to detect defects in the control circuitry of an image sensor.

18 Claims, 14 Drawing Sheets

SYSTEM AND METHOD FOR SENSOR FAILURE DETECTION

RELATED APPLICATIONS

This application is a division of co-pending U.S. patent application Ser. No. 13/763,498, entitled "System And Method For Sensor Failure Detection", which was filed on Feb. 8, 2013 by the same inventors, and which is incorporated herein by reference in its entirety.

BACKGROUND OF THE INVENTION

1. Field of the Invention

This invention relates generally to image sensors, and more particularly to failure detection in image sensors.

2. Description of the Background Art

Electronic image sensors are commonly incorporated into a variety of devices including, for example, cell phones, computers, digital cameras, PDA's, etc. In addition to conventional user-controlled still and video camera applications, more and more image sensor applications are emerging. For example, integral machine vision applications are expanding rapidly in the automotive, manufacturing, medical, security, and defense industries. In such applications, machines typically perform certain operational tasks (e.g. collision prevention tasks) based on information (e.g. position of an object relative another object) captured by the image capture system of the machine. In order for the machine to perform the proper task associated with the particular situation, it is essential for the image sensor to reliably capture, process, and output image data that accurately represents the observed situation.

A Complementary Metal Oxide Semiconductor (CMOS) image sensor typically includes a sensor array, control circuitry, row control circuitry (e.g., row address decoder, pixel drivers, etc.), column sampling circuitry, and image processing circuitry. Image sensors are often used in conjunction with a lens assembly which is aligned with the sensor array so as to focus an image thereon. The sensor array converts incident light into electrical data indicative of the image. The sensor array is made up of a plurality of light sensitive pixels arranged in a plurality of rows and columns. The pixels are electrically coupled to the row control circuitry and the column sampling circuitry via a grid of row and column signal lines, respectively. That is, each individual row of pixels is connected to, and controlled by, the row control circuitry via an associated set of row signal lines including, for example, a transfer line, a reset line, and a row select line. Each individual column of pixels is connected to the column sampling circuitry via a discrete column sampling line. The column sampling circuitry typically includes sampling components such as, for example, amplifiers, analog-to-digital converters, and data storage elements that are coupled to the column sampling lines for digitizing and storing the electrical signals output from the pixels. In image sensors that have a column parallel readout architecture, the column sampling circuitry includes a discrete set of these sampling components for each column sampling line such that an entire row of pixels can be sampled simultaneously. In column-parallel readout architectures, the column sampling circuitry also includes various signal lines that are routed to the various sampling components so as to carry control signals thereto. (Non-column parallel readout architectures also require various horizontal signal lines, although not as many as a column parallel architecture.) The image processing circuitry receives digitized data output from the column sampling circuitry and generates image data in readable format. The interface enables the image sensor to communicate (e.g., output formatted image/video data, receive operating instructions, etc.) with a host system (e.g., cell phone motherboard, vehicle computer system, manufacturing machine computer system, etc.). In general, the control circuitry of the image sensor is connected to the row control circuitry, the column sampling circuitry, the image processing circuitry, and the interface so as to carry out various timing and control operations.

Each pixel includes a photosensitive element (e.g., photodiode, photogate, etc.), a transfer transistor, a floating diffusion region, a reset transistor, a source-follower transistor, and a row-select transistor. The photosensitive element is operative to accumulate a charge proportional to the intensity of incident light to which it is exposed during shutter operations. The transfer transistor connects the photosensitive element to the floating diffusion region and includes a gate that is connected to and, therefore, controlled by a single transfer line dedicated to the entire row of pixels. When a logical high voltage signal is asserted on the transfer line, the charge from the photosensitive element is transferred to the floating diffusion region. The reset transistor connects the floating diffusion region to a voltage source terminal and includes a gate that is connected to and, therefore, controlled by a reset line of the row signal lines. When a logical high voltage signal is asserted on the reset line, the reset transistor connects the floating diffusion region to the voltage source terminal, thus resetting any previously stored charge to a known state. The source-follower transistor connects the voltage source terminal to the row-select transistor and includes a gate that is connected to the floating diffusion region so as to generate an amplified voltage signal indicative of the charge accumulated within the floating diffusion region. The row-select transistor connects the source-follower transistor to the pixel output line of the column lines and includes a gate that is connected to a row-select line of the row lines. When a logical low voltage is asserted on the row-select line the row-select transistor acts as an open switch between the source-follower transistor and the pixel output line. Oppositely, a logical high voltage asserted on the gate of the row-select line causes the row-select transistor to act as a closed switch between the source-follower transistor and the column sampling line such that the state of the floating diffusion can be sampled through the column sampling line.

Although traditional image sensors meet the needs of many image and video capture applications, there are drawbacks to current designs. For example, CMOS pixels are constructed from integrated circuit components (e.g., transistors, diodes, capacitors, etc.) that are prone to failure. As another example, pixel row signal lines (e.g., transfer lines, reset lines, row-select lines, etc.), column sampling lines, and column sampling component control lines (e.g., gain amplifier control lines, analog-to-digital converter control lines, digitized pixel data storage device control lines, etc.) are prone to damage, especially those subjected to large distributed stress-causing loads. As yet another problem, row control circuits are also prone to failure. In the event that any of the aforementioned failures occur in a conventional image sensor, it will generally output erroneous image data to the hosting system. Of course, a hosting system typically does not recognize the difference between erroneous image data and correct image data. This can be particularly problematic in certain applications (i.e. integral machine vision applications) wherein the image data dictates operational tasks performed by the host system. Even when the circuits are not very prone to damage or failure, certain applications (e.g., automotive applications) demand systems with exceptionally high reliability.

What is needed, therefore, is an image sensor design with improved image data output reliability.

SUMMARY

The present invention overcomes the problems associated with the prior art by providing an image sensor with integrated failure detection. Various aspects of the invention detect failures in the photosensing pixels, in the control lines of the pixel array, and in the sample/hold circuitry.

An example image capture device includes a plurality of pixels. Each pixel has a photosensor, a charge storage region, a signal output, and a test signal input. The charge storage region is selectively coupled to receive photocurrent from the photosensor. The signal output is coupled to the charge storage region and outputs a signal indicative of the amount of charge stored in the charge storage region. The test signal input is also coupled to the charge storage region. A test signal injection circuit is coupled to provide test signals to the test signal inputs of the pixels, and a sampling circuit is selectively coupled to receive the output signals from the outputs of the pixels. A comparison circuit compares the test signals provided to the pixels to the output signals received from the pixels, and provides an error signal if the output signals do not correspond to the test signals. Optionally, the test signal injection circuit is coupled to the comparison circuit to directly provide the test signals provided to the pixels to the comparison circuit. Various means are disclosed for comparing the test signals provided to the pixels and the output signals received from the pixels, and for providing an error signal in response to the output signals not corresponding to the test signals.

In a disclosed embodiment, the pixels are arranged in a plurality of columns, and the image capture device includes a plurality charge injection lines. Each charge injection line couples the test signal inputs of the pixels of a respective one of the columns to the test signal injection circuit. The charge storage region of each pixel is coupled to a respective one of the charge injection lines via a capacitor, and there are no switching devices interposed between the charge storage regions of the pixels and the charge injection lines.

In the disclosed embodiment, the test signal injection circuit is capable of providing different test signals on different ones of the charge injection lines, and also capable of providing different test signals on a same one of the charge injection lines at different times.

An example test signal injection circuit includes a plurality of test signal storage elements and a test signal generator. Each of the test signal storage elements is selectively coupled to a respective one of the charge injection lines. The test signal generator is coupled to the test signal storage elements and is operative to generate test signal values and store the test signal values in the storage elements.

In a particular embodiment, the test signal generator is operative to generate digital test signal values, and each of the storage elements is a single-bit storage element. The test signal generator includes a random bit generator. The storage elements are coupled together serially, and bits from the random bit generator are shifted into the storage elements.

The pixels can operate in either image capture mode or test mode. The charge storage region of each pixel is selectively coupled to the photosensor of each the pixel by a switching device of each the pixel. A controller is coupled to provide transfer signals to the switching devices of the pixels. Responsive to a first value of the transfer signals, the switching devices conduct photocurrent between the photosensors and the charge storage regions to facilitate image capture. Responsive to a second value of the transfer signal, the switching devices block photocurrent between the photosensors and the charge storage regions to facilitate test signal injection. In operation, the image capture device executes a repetitive image capture process over successive frame times to capture frames of image data. The controller asserts the second value of the transfer signal for the duration of an image capture process to facilitate test signal injection every Nth frame time, where N is an integer greater than one.

Means of detecting failures in the control circuitry of an image capture device are also disclosed. In an example image capture device a controller provides a control signal. A driver, responsive to the control signal, is operative to generate a drive signal based on the control signal and to assert the drive signal on a control line of the image capture device. A comparator responsive to a first input based on the control signal and a second input based on the drive signal, generates an error signal if the control signal does not correspond to the asserted drive signal in a predetermined way. In a particular embodiment, the comparator directly compares the control signal to the drive signal to determine whether the drive signal corresponds to the control signal. Various means are disclosed for comparing the first input based on the control signal and the second input based on the drive signal, and for generating an error signal if the control signal does not correspond to the asserted drive signal in a predetermined way.

In one instance, the driver is a row control driver of an image sensor array. In another instance, the driver is a component of an image data sampling circuit, which receives rows of data from the image sensor array.

Various means for comparing control signals and drive signals are disclosed. In one example embodiment, the image capture device additionally includes a second driver coupled to receive the control signal and operative to generate a second drive signal based on the control signal, and the comparator compares the second drive signal to the drive signal.

In another example embodiment, a first encoder is coupled to a plurality of control lines at a first point and generates a first encoded value based on drive signals detected on the control lines. A second encoder is coupled to the plurality of control lines at a second point spaced apart from the first point, and generates a second encoded value based on drive signals detected on the control lines at the second point. The comparator is operative to compare the first encoded value to the second encoded value.

Methods for detecting defects in an image capture device are also disclosed. An example method includes providing an image capture device including a sensor array, causing an image to be focused on the sensor array, and repeatedly capturing frames of image data with the sensor array. The image data is indicative of the image focused on the sensor array. The method additionally includes periodically injecting test data into the sensor array between the repeated captures of the image data, reading the test data from the image capture device, and comparing the read test data to the injected test data. An error signal is generated if the read test data does not correspond to the injected test data.

Another example method includes receiving a control signal, generating a drive signal based on the control signal, and asserting the drive signal on a control line of the image capture device. The method additionally includes comparing the asserted drive signal to the control signal and generating an error signal if the control signal does not correspond to the asserted drive signal in a predetermined way. In a particular method, the step of asserting the drive signal on a control line of the image capture device includes asserting the drive signal on a row control line of an image sensor array. In another particular method, the step of asserting the drive signal on a control line of the image capture device includes asserting the drive signal on a control line of an image data sampling circuit. In yet another particular method, the step of comparing the asserted drive signal to the control signal includes generating a second drive signal based on the control signal and comparing the second drive signal to the drive signal.

In another example method, the step of comparing the asserted drive signal to the control signal includes generating first encoded value based on drive signals being asserted at a first point on a plurality of control lines and generating a second encoded value based on the drive signals at a second point on the plurality of control lines. Then, the first encoded value is compared to the second encoded value.

Additional methods for detecting defects in an image capture device are disclosed. An example method includes receiving a control signal, generating a drive signal based on the control signal, asserting the drive signal on a control line of the image capture device, and comparing the asserted drive signal to the control signal. The method additionally includes generating an error signal if the control signal does not correspond to the asserted drive signal in a predetermined way.

In a particular method, the step of asserting the drive signal on a control line of the image capture device includes asserting the drive signal on a row control line of an image sensor array. In another particular method, the step of asserting the drive signal on a control line of the image capture device includes asserting the drive signal on a control line of an image data sampling circuit.

Optionally, the step of comparing the asserted drive signal to the control signal can include generating a second drive signal based on the control signal and comparing the second drive signal to the drive signal. As another option, the step of comparing the asserted drive signal to the control signal can include generating a first encoded value based on drive signals being asserted at a first point on a plurality of control lines, generating a second encoded value based on the drive signals at a second point on the plurality of control lines, and comparing the first encoded value to the second encoded value.

The various methods can also be used in combination. For example, the methods summarized above can additionally include receiving a second control signal, generating a second drive signal based on the second control signal, asserting the second drive signal on a second control line of the image capture device, and comparing inputs base on the second drive signal and the second control signal. A second error signal is generated if the second control signal does not correspond to the second drive signal in a predetermined way.

In an example method, the image capture device additionally includes an image sensor array and an image data sampling circuit coupled to receive rows of data from the image sensor array. In this example method, the drive signal is a row control drive signal in the image sensor array, and the second drive signal is a drive signal in the image data sampling circuit.

Another example method additionally includes periodically injecting test data into the image sensor array; and comparing the test data injected into the image sensor array with the test data received from the sensor array by the image data sampling circuit. The example method also includes generating a third error signal if the test data injected into the image sensor array does not correspond in a predetermined way with the test data received from the sensor array by the image data sampling circuit.

An example image capture device is also disclosed. The example image capture device includes a controller operative to provide a control signal, a driver and a comparator. The driver is responsive to the control signal and operative to generate a drive signal based on the control signal and to assert the drive signal on a control line of the image capture device. The comparator is responsive to a first input based on the control signal and a second input based on the drive signal. The comparator generates an error signal if the control signal does not correspond to the asserted drive signal in a predetermined way.

Various means are disclosed for comparing the first input based on the control signal and the second input based on the drive signal, and for generating an error signal if the control signal does not correspond to the asserted drive signal in a predetermined way In a particular example embodiment, the comparator directly compares the control signal to the drive signal to determine whether the drive signal corresponds to the control signal.

In one instance, the image capture device additionally includes an image sensor array, and the driver is a row control driver of the image sensor array. In another instance, the image capture device additionally includes an image data sampling circuit coupled to receive rows of data from the image sensor array, and the driver is a component of the image data sampling circuit.

Multiple means for determining whether the control signal corresponds to the drive signal are disclosed. For example, in an example embodiment, the image capture device additionally includes a second driver coupled to receive the control signal. The second driver is operative to generate a second drive signal based on the control signal, and the comparator is operative to compare the second drive signal to the drive signal.

In another example embodiment, the image capture device additionally includes a plurality of the control lines. A first encoder is coupled to the plurality of control lines at a first point and is operative to generate a first encoded value based on drive signals detected on the control lines. A second encoder is coupled to the plurality of control lines at a second point spaced apart from the first point and is operative to generate a second encoded value based on drive signals detected on the control lines. The comparator then compares the first encoded value to the second encoded value.

Multiple example embodiments of the invention can be implemented in a single image capture device. For example, in addition to the first driver, a disclosed embodiment includes a second driver responsive to a second control signal. The second driver is operative to generate a second drive signal and to assert the second drive signal on a second control line of the image capture device. A second comparator is responsive to a first input based on the second control signal and a second input based on the second drive signal. The second comparator is operative to generate a second error signal if the second control signal does not correspond to the second drive signal in a predetermined way. In addition, the image capture device includes an image sensor array and an image data sampling circuit coupled to receive rows of data from the image sensor array. The driver is a row control driver of the image sensor array, and the second driver is a component of the image data sampling circuit. Furthermore, the example image capture device additionally includes a test data injection circuit operative to periodically inject test data into the image sensor array. A third comparator is operative to compare the test data injected into the image sensor array with the test data received from the sensor array by the image data sampling circuit. The third comparator also generates a third error signal if the test data injected into the image sensor array does not correspond in a predetermined way with the test data received from the sensor array by the image data sampling circuit.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing an image sensor that includes malfunction detection circuitry. In the following description, numerous specific details are set forth (e.g., image sensor types, pixel types, transistor types, number of pixels, etc.) in order to provide a thorough understanding of the invention. Those skilled in the art will recognize, however, that the invention may be practiced apart from these specific details. In other instances, details of well-known integrated circuit image sensor manufacturing practices (e.g., transistor forming, color filter forming, wafer singulation, semiconductor doping, etc.) and components have been omitted, so as not to unnecessarily obscure the present invention.

Figure 1:
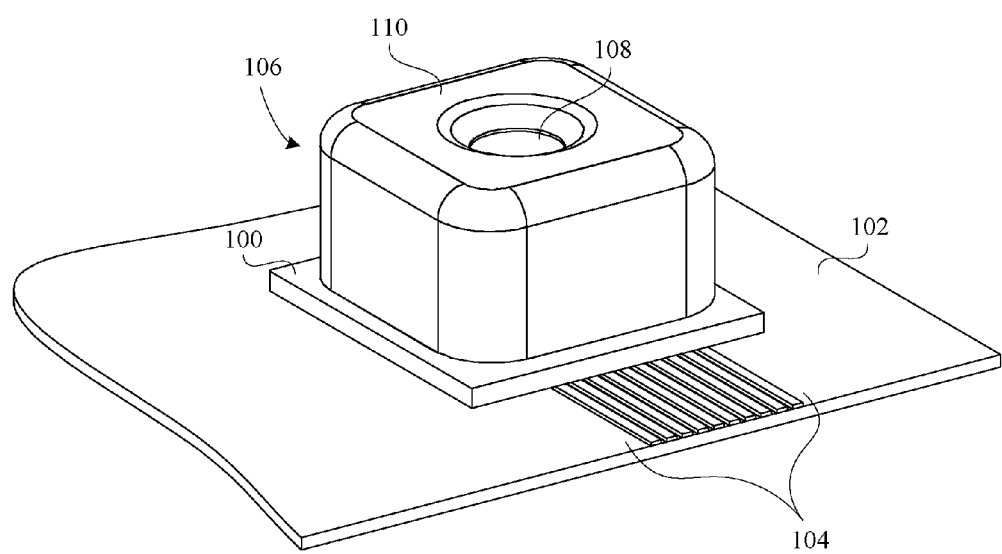
FIG. 1 is a perspective view of an image sensor mounted on a host device circuit board.

FIG. 1 is a perspective view of an image sensor 100 mounted on a portion of a printed circuit board (PCB) 102 that represents a PCB of a camera hosting device (e.g., automobile, manufacturing machine, medic device, cell phone, etc.). Image sensor 100 communicates electronically with other components of the hosting device via a plurality of conductive traces 104. In the example embodiment, image sensor 100 is depicted as being part of a camera module 106 that further includes an optical assembly 108 and a housing 110. As shown, housing 110 is mounted to image sensor 100 and optical assembly 108 is secured therebetween. Those skilled in the art will recognize that the particular designs and/or presence of PCB 102, traces 104, optical assembly 108, and housing 110 will depend on the particular application, and are not particularly relevant to the present invention. Therefore, PCB 102, traces 104, optical assembly 108, and housing 110 are representational in character only.

Figure 2:
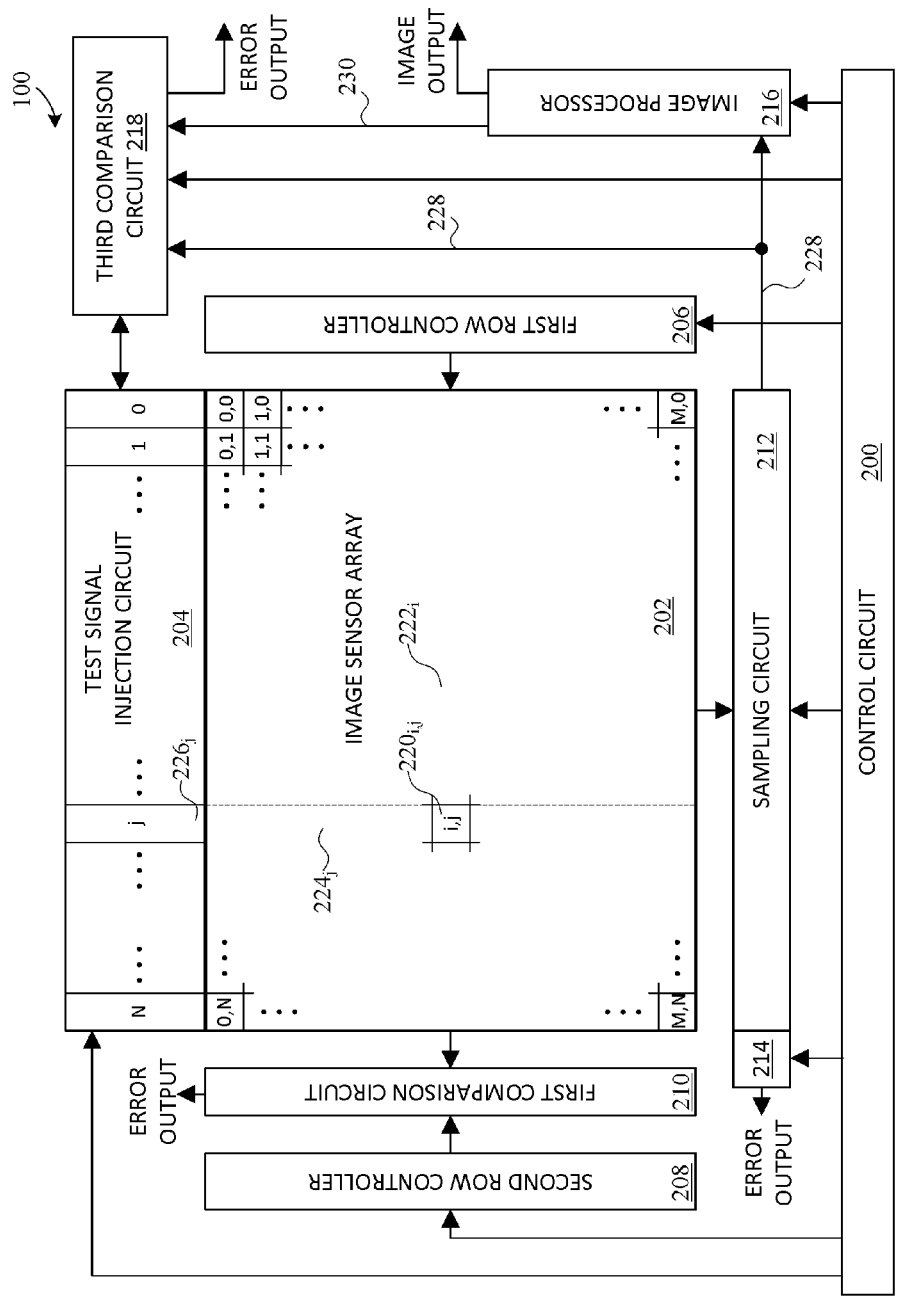
FIG. 2 is a block diagram of the image sensor of FIG. 1.

FIG. 2 is a block diagram of image sensor 100 which, in the example embodiment, is a backside illuminated (BSI) complementary metal oxide semiconductor (CMOS) image sensor system-on-chip (SOC). Image sensor 100 includes a control circuit 200, a pixel array 202, a test signal injection circuit 204, a first row controller 206, a second row controller 208, a first comparison circuit 210, a sampling circuit 212, a second comparison circuit 214, an image processor 216, and a third comparison circuit 218.

Control circuit 200 provides the primary means for coordinating and controlling the various components of image sensor 100. For example, control circuit 200 is operative to cause test signal injection circuit 204 to operate in either test mode or image capture mode. As another example, control circuit 200 is operative to provide both first row controller 206 and second row controller 208 with row control signals. As yet another example, control circuit 200 provides sampling circuit 212 with sampling control signals.

Pixel array 202 includes a plurality of pixels 220 arranged in a plurality of rows 222 and a plurality of columns 224. That is, pixel array 202 includes M+1 rows 222 wherein the first is denoted row $222_0$ and the last as row $222_M$. Similarly, pixel array 202 includes N+1 columns 224 wherein the first is denoted column $224_0$ and the last as column $224_N$. Each of pixels 220 has a unique address i,j wherein i denotes the row of the address and j denotes the column of the address.

Test signal injection circuit 204 includes N+1 column injection circuits 226 which are connected to, and denoted in the same fashion as, columns 224. Accordingly, the first of column injection circuits is denoted $226_0$ and the last as $226_N$. Each of column injection circuits $226_0$ through $226_N$ are operative to inject a test signal into a respective one of pixel columns $224_0$ through $224_N$ when test signal injection circuit 204 is instructed to do so by control circuit 200. When test signal injection circuit 204 is instructed to operate in image capture mode, all column injection circuits $226_0$ through $226_N$ inject the same reference signal into each of respective columns $224_0$ through $224_N$.

First row controller 206 is operative to generate row control signals defined by row control signal instructions output from control circuit 200. Furthermore, row controller 206 is electrically coupled to each of rows 222 so as to assert the generated row control signals directly thereon. Second row controller 208 is also operative to generate the same row control signals defined by the same row control signal instructions output from control circuit 200. Unlike first row controller 206, the row control signals generated by second row controller 208 are not intended to drive rows 222. Rather, they are used by first comparison circuit 210 to check whether or not the control signals generated by first row controller 206 have been properly distributed across rows 222. That is, first comparison circuit 210 receives the control signals generated by second row controller 208 and then compares them with the electrical state of rows 222. If the electrical state of rows 222 do not correspond with the control signals generated by second row controller 208, first comparison circuit 210 outputs an error signal indicating that the control signals generated by first row controller 206 have not been properly distributed across one or more of rows 222.

Sampling circuit 212 is operative to perform sampling operations according to column sampling instructions from control circuit 200. As each row 222 is sequentially selected by first row controller 206, sampling circuit 212 acquires digital data indicative of the electrical state of each column 224. Accordingly, acquiring digital data for every pixel 220 of pixel array 202 requires sampling each of the N+1 columns 224 a total number of M+1 times per frame. Each time sampling circuit 212 acquires a row sample, it outputs the digital data to image processor 216 via data line(s) 228 for further processing.

Second comparison circuit 214 receives the same column sampling instructions that are provided to sampling circuit 212 by control circuit 200. Second comparison circuit 214 compares the sampling instructions with actual control signals driving sampling circuit 212. If the actual signals driving sampling circuit 212 do not correspond with the sampling instructions, second comparison outputs an error signal.

Image processor 216 is operative to convert the digital data acquired by sampling circuit 212 into readable image data via known image processing techniques.

Third comparison circuit 218 is operative to compare the test signals injected into columns 224 via test signal injection circuit 204 with the resultant digital data acquired by sampling circuit 212. If the resultant digital data acquired by sampling circuit 212 does not properly correspond with the test signals, third comparison circuit 218 outputs an error signal. Third comparison circuit 218 can receive the digital data directly from sampling circuit 212 via data lines 228 or, optionally, via image processor 216 and data lines 230.

Figure 3:
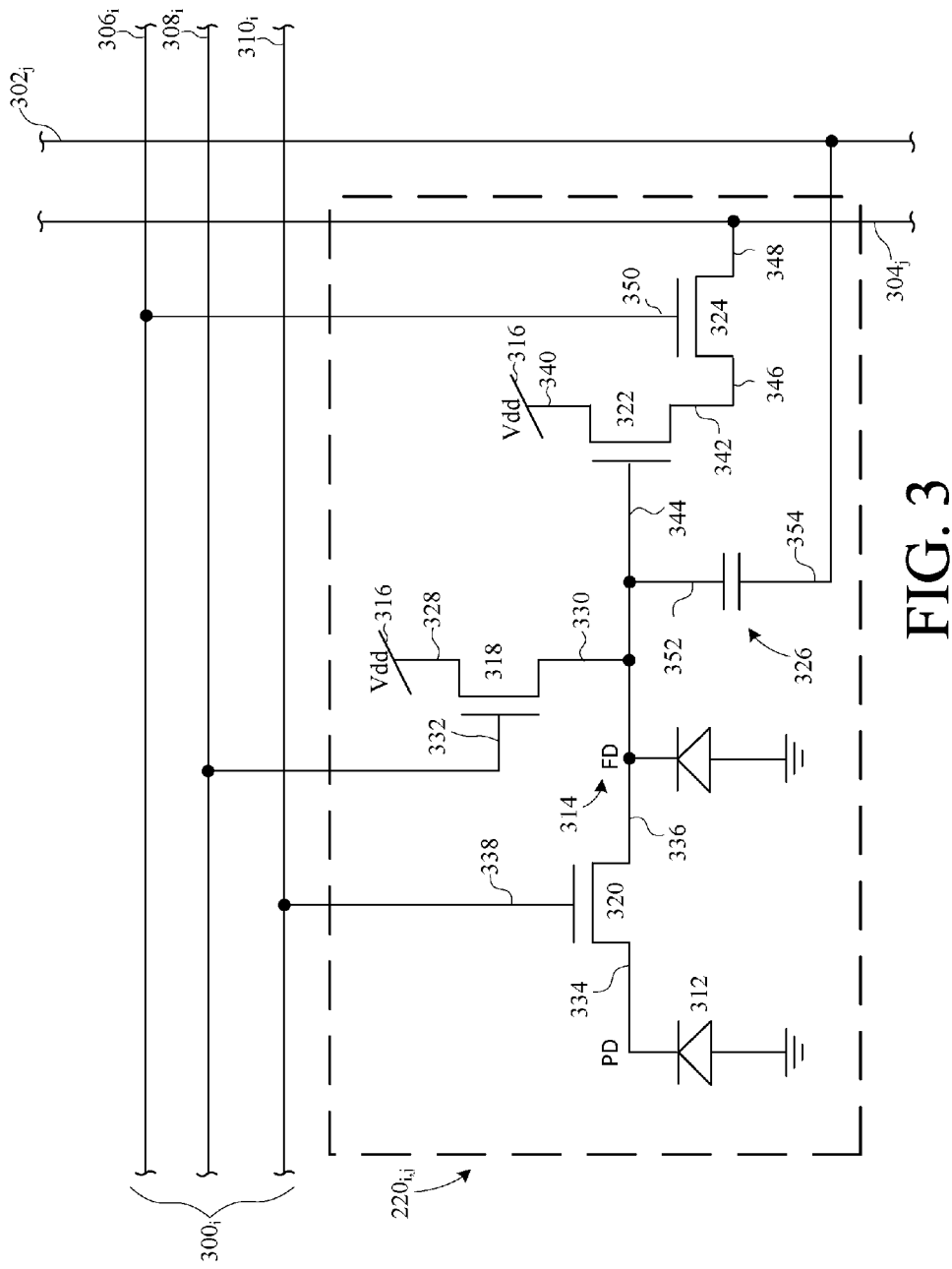
FIG. 3 is a schematic of a pixel of the image sensor of FIG. 1.

FIG. 3 is a schematic of pixel $220_{i,j}$ of pixel array 202 coupled to a set of row control signal lines $300_i$, a charge injection line $302_j$, and a readout line $304_j$. Row control signal lines $300_i$ include a row select line $306_i$ a reset line $308_i$ and a transfer line $310_i$. Row control signal lines $300_i$ may extend across the entire row $222_i$ such that first row controller 206 may provide the same control signal to pixels $220_{i,0}$ through $220_{i,N}$ of row $222_i$. Likewise, charge injection line $302_j$ and readout line $304_j$ may extend along the entire column $224_j$. Charge injection line $302_j$ enables test signal injection circuit 204 to inject test signals into pixels $220_{0,j}$ through $220_{M,j}$. Readout line $304_j$ enables sampling circuit 212 to sample the electrical state of pixels $220_{0,j}$ through $220_{M,j}$.

In the example embodiment, pixel $220_{i,j}$ is a four-transistor (4T) pixel that includes a photosensor 312, a charge storage region 314, a pixel voltage source terminal ($V_{dd}$) 316, a reset transistor 318, a transfer transistor 320, a source-follower transistor 322, a row select transistor 324, and a coupling capacitor 326. Photosensor 312 is, for example, a photodiode (PD) operative to convert incident light into electrical charge. Charge storage region 314 is a floating diffusion (FD) element operative to store charge generated by photosensor 312. Pixel voltage source terminal 316 provides a voltage to both reset transistor 318 and source follower transistor 322. Reset transistor 318 includes a first terminal 328 coupled to voltage source terminal 316, a second terminal 330 coupled to charge storage region 314, and a gate 332 coupled to reset line $308_i$. When first row controller 206 asserts a reset signal, in this case a high voltage pulse, on gate 332 via reset line $308_i$ transistor 318 is temporarily placed into a conducting state wherein charge storage region 314 is coupled to voltage source terminal 316. As a result, the previous charge state of storage region 314 is returned to a known reference charge state. Once reset line $308_i$ is returned to a low voltage state, reset transistor 318 returns to a non-conducting state wherein charge storage region 314 is electrically isolated from voltage source terminal 316. Transfer transistor 320 includes a first terminal 334 coupled to photosensor 312, a second terminal 336 coupled to charge storage region 314, and a gate 338 coupled to transfer line $310_i$. When first row controller 206 asserts a transfer signal, in this case a high voltage, on gate 338 via transfer line $310_i$ transistor 320 is placed into a conducting state wherein photosensor 312 is coupled to charge storage region 314. As a result, the charge generated by photosensor 312 is transferred to charge storage region 314. Once transfer line $310_i$ is returned to a low voltage state, transfer transistor 320 returns to a non-conducting state wherein charge storage region 314 is electrically isolated from photosensor 312. Source-follower transistor 322 includes a first terminal 340 coupled to voltage source terminal 316, a second terminal 342 coupled to row select transistor 324, and a gate 344 coupled to charge storage region 314. Those skilled in the art will recognize that electrical state of terminal 342 is dictated by the charge state of gate 344 and, therefore, the charge state of charge storage region 314. Accordingly, terminal 342 may function as the output terminal of pixel $220_{i,j}$, which is operative output an electrical signal indicative of the charge stored in charge storage region 314. Row select transistor 324 includes a first terminal 346 coupled to terminal 342 of source-follower transistor 322, a second terminal coupled to readout line $304_j$, and a third terminal 350 coupled to row select line $306_i$. When first row controller 206 asserts a row select signal, in this case a high voltage, on row select line $306_i$ row select transistor 324 operates in a conducting state wherein first terminal 346 and second terminal 348 are electrically coupled to one another, thus asserting the signal output from terminal 342 onto readout line $304_j$. Row select transistor 324 operates in an open state when a row select signal is not being asserted on row select line $306_i$ thus disconnecting the output terminal of pixel $220_{i,j}$ from readout line $304_j$. Coupling capacitor 326 includes a first terminal 352 to charge storage region 314 and a second terminal 354 coupled to charge injection line $302_j$. Coupling capacitor 326 enables test signal injection circuit 204 (from FIG. 2) control the charge state of charge storage region 314 by controlling the voltage asserted on charge injection line $302_j$. When image sensor 100 operates in image capture mode, the voltage of charge injection lines 302 are held at a known reference level before and after the charge generated by photosensor 312 is transferred to charge storage region 314. With charge injection line 302 held at a fixed voltage, the amount of charge generated by photosensor 312 in a given time frame is measured as difference between the charge state of charge storage region 314 before and after the charge from photosensor 312 is transferred thereto.

When image sensor 100 operates in test mode, test signal injection circuit 204 transfers a test signal into pixels 220 by altering the voltage asserted on charge injection line 302 and, therefore, terminal 354 of capacitor 326. By altering the voltage level, the charge state of charge storage region 314 is adjusted to a value that simulates a known light intensity. For example, if the same reference voltage that is asserted on charge injection line 302 during image capture mode is asserted on charge injection line 302 during test mode, the electrical state of readout line $304_j$ will appear as if photosensor 312 has generated minimal charge. As will be explained in further detail later, sampling circuit 212 (from FIG. 2) samples readout line $304_j$ normally as it would during image capture mode, and third comparison circuit 218 compares the data sample with the injected test signal and outputs an error signal when they do not agree.

In the example embodiment of FIG. 3, the test signals are injected into the charge storage region 314. However, the test signals can optionally be injected into the photosensor 312, for example via reset transistor 318 and transfer transistor 320.

Figure 4:
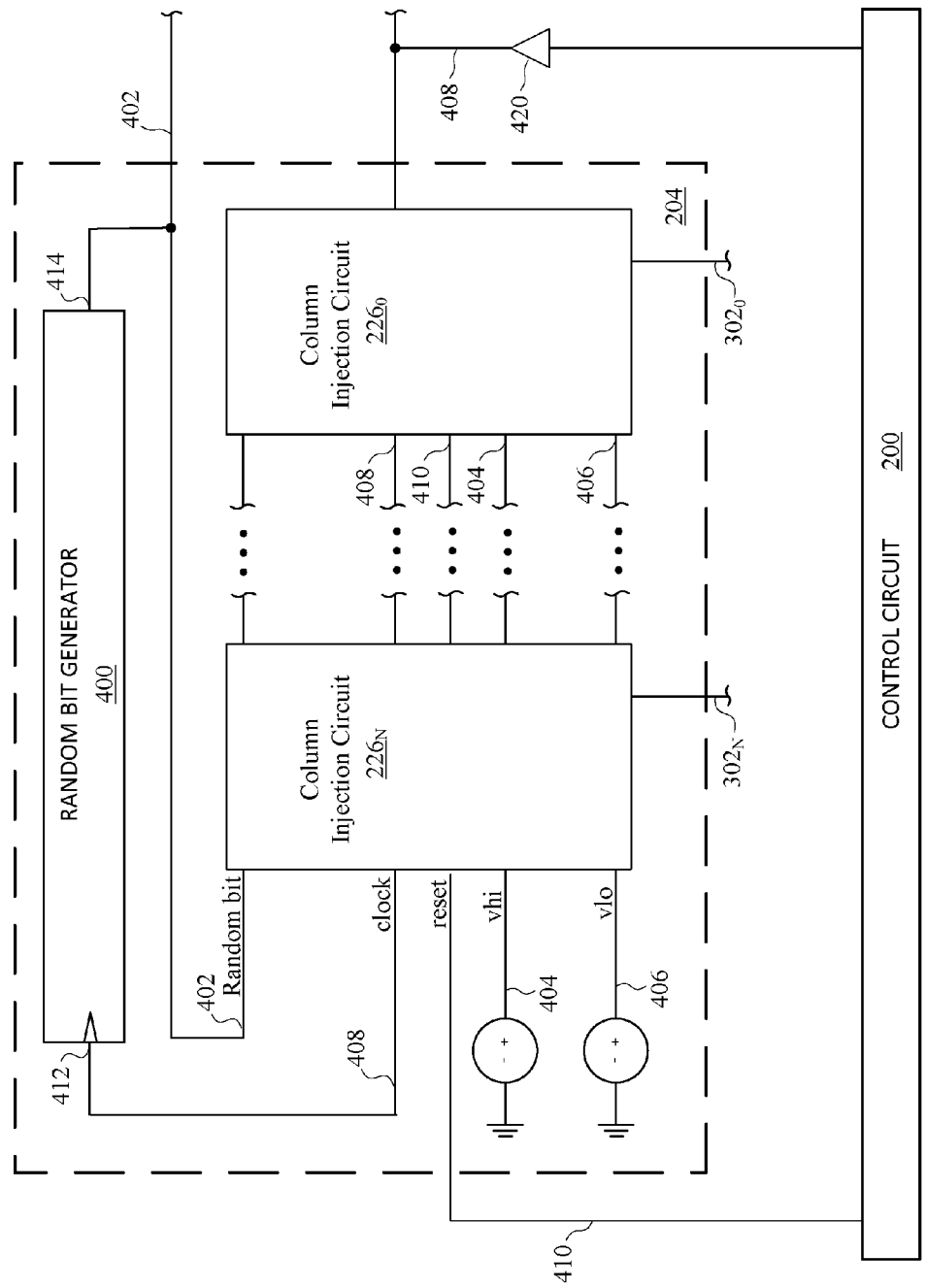
FIG. 4 is a schematic of a test signal injection circuit of the image sensor of FIG. 1.

FIG. 4 is a schematic of test signal injection circuit 204 according to one embodiment of the present invention. In addition to column injection circuits $226_0$ through $226_N$, test signal injection circuit 204 includes a random bit generator 400, a random bit supply line 402, a logical high voltage supply line 404, and a logical low voltage supply line 406. Furthermore, test signal injection circuit 204 is coupled to a buffered clock signal line 408 and a charge injection reset signal line 410. Buffered clock signal line 408 is routed into test signal injection circuit 204 from control circuit 200 to supply clock signals to column injection circuits $226_0$ through $226_N$ and random bit generator 400. Buffer 420 may be coupled between control circuit 200 and column injection circuit 204 to buffer and/or amplify the clock signal from control circuit 200.

Charge injection reset line 410 is routed into test signal injection circuit 204 from control circuit 200 to supply reset signals to column injection circuits $226_0$ through $226_N$. Random bit generator 400 includes an input terminal 412 and an output terminal 414 coupled to buffered clock signal line 408 and random bit supply line 402, respectively. In one embodiment, random bit generator 400 may be a Linear Feedback Shift Register (LFSR) that is operative to assert a randomly generated data bit onto random bit supply line 402 in response to receiving a clock signal from buffered clock signal line 408. Random bit supply line 402 is routed to supply random data bits to column injection circuits $226_0$ through $226_N$ and is also routed out of test signal injection circuit 204 to third comparison circuit 218 (from FIG. 2). High voltage supply line 404 and low voltage supply line 406 are routed across test signal injection circuit 204 to column injection circuits $226_0$ through $226_N$.

Figure 5:
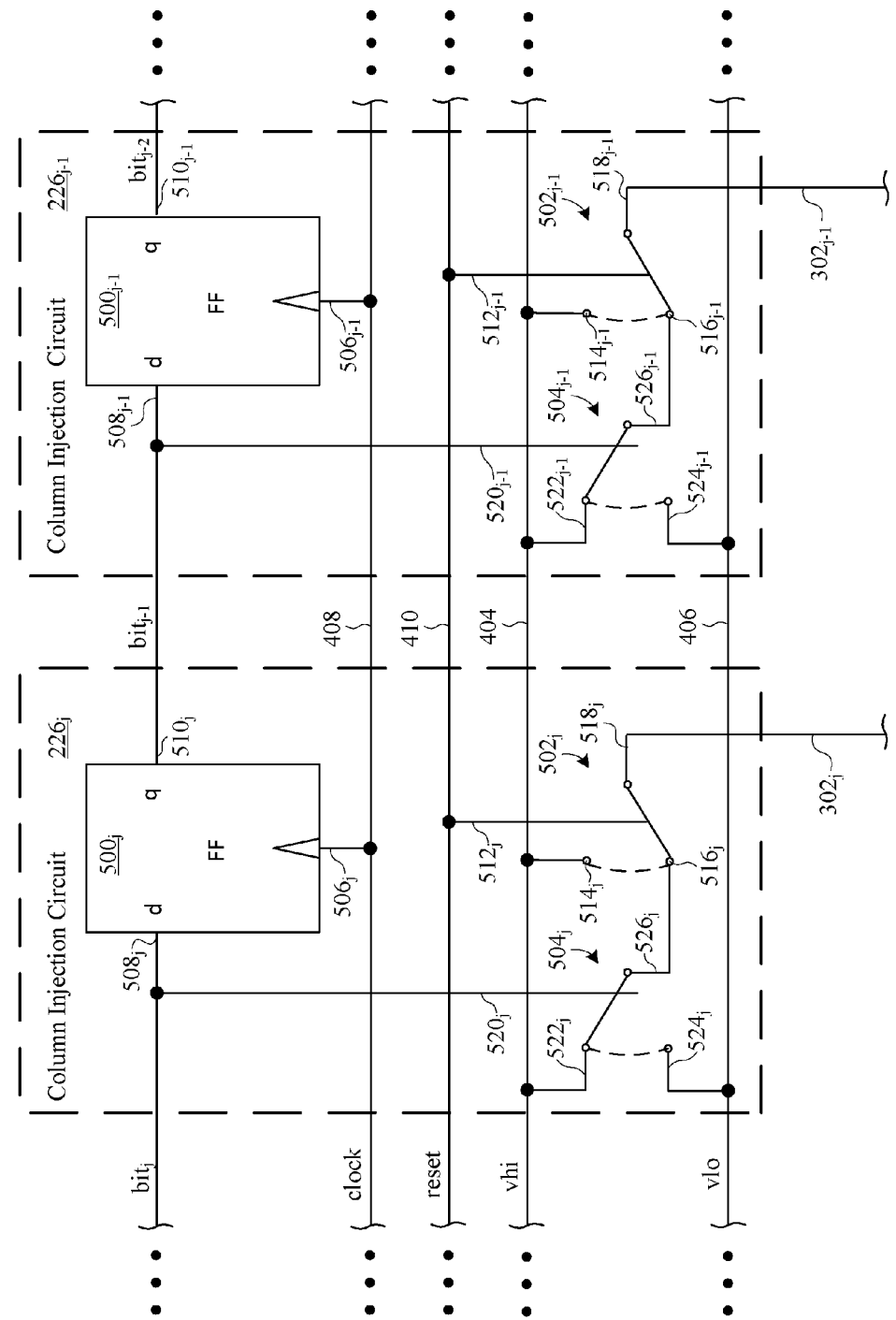
FIG. 5 is a circuit diagram of two adjacent column injection circuits of the test signal injection circuit of FIG. 4.

FIG. 5 is a schematic of column injection circuit $226_j$ and adjacent column injection circuit $226_{j-1}$. Each column injection circuit $226_N$ through $226_0$ includes a memory element 500, a first switch circuit 502, and a second switch circuit 504. In the illustrated embodiment, each memory element 500 is a flip-flop circuit having a clock input terminal 506 coupled to buffered clock signal line 408, a data-bit input terminal 508, and a data-bit output terminal 510. Data-bit input terminal 508 of memory element $500_N$ (not shown) is coupled to random bit supply line 402 (from FIG. 4). With the exception of memory element $500_N$, data-bit input terminal 508 of subsequent memory elements $500_{N-1}$ through $500_0$ are coupled to the output terminals 510 of the adjacent memory element 500. For example, data-bit input terminal 508 of memory element $500_j$ is coupled to data-bit output terminal 510 of adjacent memory element $500_{j+1}$. Likewise, data-bit input terminal 508 of memory element $500_{j-1}$ is coupled to data-bit output terminal 510 of adjacent memory element $500_j$. Accordingly, memory elements 500 are flip-flops that are cascaded together to form a single serial-in shift register, wherein data-bits are serially shifted in from random bit generator 400 via random bit supply line 402. Those skilled in the art will recognize that when buffered clock signal line 408 is clocked, random bit generator 400 asserts a new data bit on data-bit input terminal $508_N$ thus shifting the data bit that was previously stored in memory element $500_N$ into $500_{N-1}$. Thus, loading a newly generated data-bit into memory $500_0$ requires asserting N+1 clock signals on buffered clock signal line 408. In the example embodiment of FIG. 5, memory element 500 are flip-flops, in other embodiments, memory element 500 may be pulsed latches or random access memories (RAM).

First switch circuit 502 includes a control terminal 512 coupled to charge injection reset signal line 410, a first input terminal 514 coupled to logical high voltage line 404, a second input terminal 516 coupled to second switch circuit 504, and an output terminal 518 coupled to charge injection line 302. Under the control of charge injection reset signal line 410, first switch circuit 502 selectively couples charge injection line 302 to either logical high voltage line 404 or second switch circuit 504. Second switch circuit 504 includes a control terminal 520 coupled to input terminal 508 of memory element 500, a first input terminal 522 coupled to logical high voltage supply line 404, a second input terminal 524 coupled to logical low voltage supply line 406, and an output terminal 526 coupled to second input terminal 516 of first switch circuit 502. Under the control of input terminal 508, second switch circuit 504 selectively couples the second input terminal 516 of first switch 502 to either logical high voltage supply line 404 or logical low voltage supply line 406.

Figure 6:
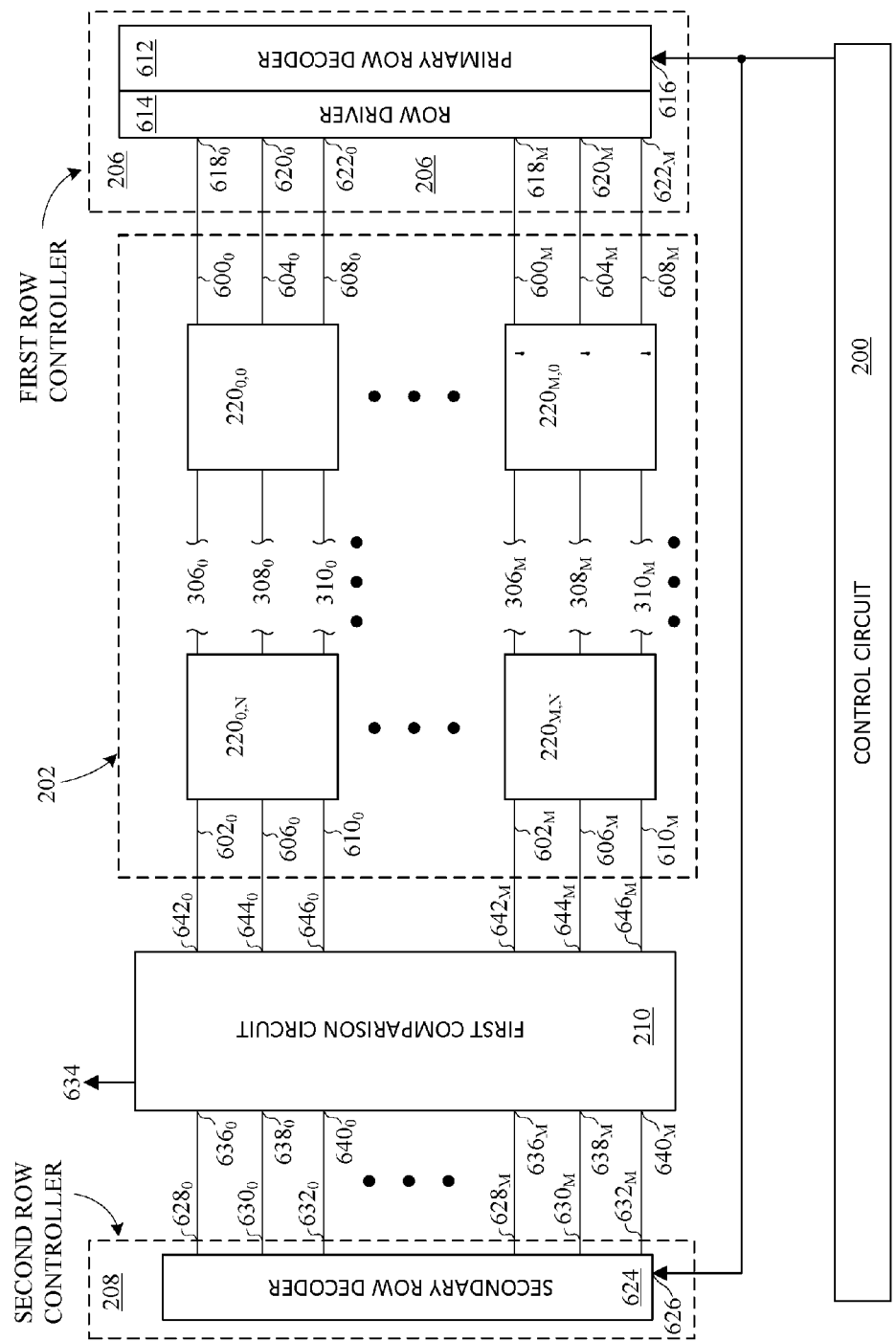
FIG. 6 is a circuit diagram of a pixel array, a first row controller, a second row controller, and comparison circuit of the image sensor of FIG. 1.

FIG. 6 is a circuit diagram showing features of pixel array 202, first row controller 206, second row controller 208, and first comparison circuit 210. Both first row controller 206 and second row controller 208 are coupled to receive row control instructions output from control circuit 200 in the form of data bits. In the illustrated embodiment, the row control instructions output from control circuit 200 include row address instructions for controlling row select lines $306_0$ through $306_M$, reset line control instructions for controlling reset lines $308_0$ through $308_M$, and transfer line control instructions for controlling transfer lines $310_0$ through $310_M$. The row address instructions are in the form of data bits that indicate which of row select lines $306_0$ through $306_M$ will be asserted. Each of row select lines $306_0$ through $306_M$ includes a first end 600 and a second end 602 coupled to first row controller 206 and first comparison circuit 210, respectively. Each of reset lines $308_0$ through $308_M$ also include a first end 604 and a second end 606 coupled to first row controller 206 and first comparison circuit 210, respectively. Each of transfer lines $310_0$ through $310_M$ also include a first end 608 and a second end 610 coupled to first row controller 206 and first comparison circuit 210, respectively.

First row controller 206 includes a primary row decoder 612 and a row driver 614. Primary row decoder 612 includes an input terminal 616 coupled to receive row control signal instructions from control circuit 200. Row driver 614 is coupled to primary row decoder 612 and is operative to assert row select signals on row select lines $306_0$ through $306_M$, reset signals on reset lines $308_0$ through $308_M$, and transfer signals on transfer lines $310_0$ through $310_M$ according the row control instructions decoded by primary row decoder 612. Row driver 614 includes a plurality of output terminals $618_0$ through $618_M$, $620_0$ through $620_M$, and $622_0$ through $622_M$. Output terminals $618_0$ through $618_M$ are operative to output row select signals associated with respective row select lines $306_0$ through $306_M$. First ends $600_0$ through $600_M$ are coupled to output terminals $618_0$ through $618_M$, respectively. Output terminals $620_0$ through $620_M$ are operative to output reset signals associated with respective reset lines $308_0$ through $308_M$. First ends $604_0$ through $604_M$ are coupled to output terminals $620_0$ through $620_M$, respectively. Output terminals $622_0$ through $622_M$ are operative to output transfer signals associated with respective transfer lines $310_0$ through $310_M$. First ends $608_0$ through $608_M$ are coupled to output terminals $622_0$ through $622_M$, respectively.

Second row controller 208 comprises a secondary row decoder 624 that includes an input terminal 626. Second row controller 208 further includes a plurality of output terminals $628_0$ through $628_M$, $630_0$ through $630_M$, and $632_0$ through $632_M$, collectively output terminals 628, 630 and 632 respectively. Input terminal 626 of secondary row decoder 624 is coupled to receive the same row control signal instructions provided to input primary row decoder 612 by control circuit 200. Accordingly, primary row decoder 612 and secondary row decoder 624 simultaneously decode that same row control signal instructions such that the logic states of output terminals $628_0$ through $628_M$ match the logic states of respective output terminals $618_0$ through $618_M$, the logic states of output terminals $630_0$ through $630_M$ match the logic states of respective output terminals $620_0$ through $620_M$, and the logic states of output terminals $632_0$ through $632_M$ match the logic states of respective output terminals $622_0$ through $622_M$. For example, when output terminal $618_0$ changes from a low voltage state to a high voltage state, output terminal $628_0$ also changes from a low voltage state to a high voltage state at the exact same time.

First comparison circuit 210 is operative to compare the electrical states of row control signal lines $300_0$ through $300_M$, which comprises row select lines $306_0$ through $306_M$, reset line $308_0$ through $308_M$ and transfer line $310_0$ through $310_M$, with control signals output from secondary row decoder 624. If the logic state of a particular row control signal for a given row, such as row select line $306_0$ do not agree with the logical state of output $628_0$, then, first comparison circuit 210 outputs an error signal from an error signal output line 634.

First comparison circuit 210 includes a first plurality of input terminals including input terminals $636_0$ through $636_M$, $638_0$ through $638_M$, and $640_0$ through $640_M$. Input terminals $636_0$ through $636_M$ are electrically coupled to respective output terminals $628_0$ through $628_M$, input terminals $638_0$ through $638_M$ are electrically coupled to respective output terminals $630_0$ through $630_M$, and input terminals $640_0$ through $640_M$ are electrically coupled to respective output terminals $632_0$ through $632_M$. First comparison circuit 210 further includes a second plurality of input terminals including input terminals $642_0$ through $642_M$, $644_0$ through $644_M$, and $646_0$ through $646_M$. Input terminals $642_0$ through $642_M$ are electrically coupled to respective second ends $602_0$ through $602_M$ of respective row select lines $306_0$ through $306_M$. Likewise, input terminals $644_0$ through $644_M$ are electrically coupled to respective second ends $606_0$ through $606_M$ of respective reset lines $308_0$ through $308_M$. Finally, input terminals $646_0$ through $646_M$ are electrically coupled to respective second ends $610_0$ through $610_M$ of respective transfer lines $310_0$ through $310_M$.

During operation, first comparison circuit 210 determines if the logical state of input terminals $636_0$ through $636_M$ have a predetermined correspondence with those of respective input terminals $642_0$ through $642_M$, if the logical state of input terminals $638_0$ through $638_M$ correspond with those of respective input terminals $644_0$ through $644_M$, and if the logical states of input terminals $640_0$ through $640_M$ correspond with those of respective input terminals $646_0$ through $646_M$. If not, error output line 634 outputs an error signal indicating that image sensor 100 is malfunctioning.

In the event that one of control signal lines $300_0$ through $300_M$ are damaged, it is likely that a row control signal asserted thereon row driver 614 will not be properly distributed to all of the pixels within the associate row. It is important to understand that simultaneously decoding each set of row control signal instructions via primary row decoder 612 and secondary row decoder 624 and then comparing the electrical states of output terminals 628, 630, and 632 with respective second ends 602, 606, and 610 of control signal lines 300, ensures that the row control signals from row driver 614 are being properly distributed across row control signal lines 300. In contrast, prior art image sensors typically have no way of detecting such a malfunction and are, therefore, much more likely to output inaccurate image data to the host device.

Figure 7:
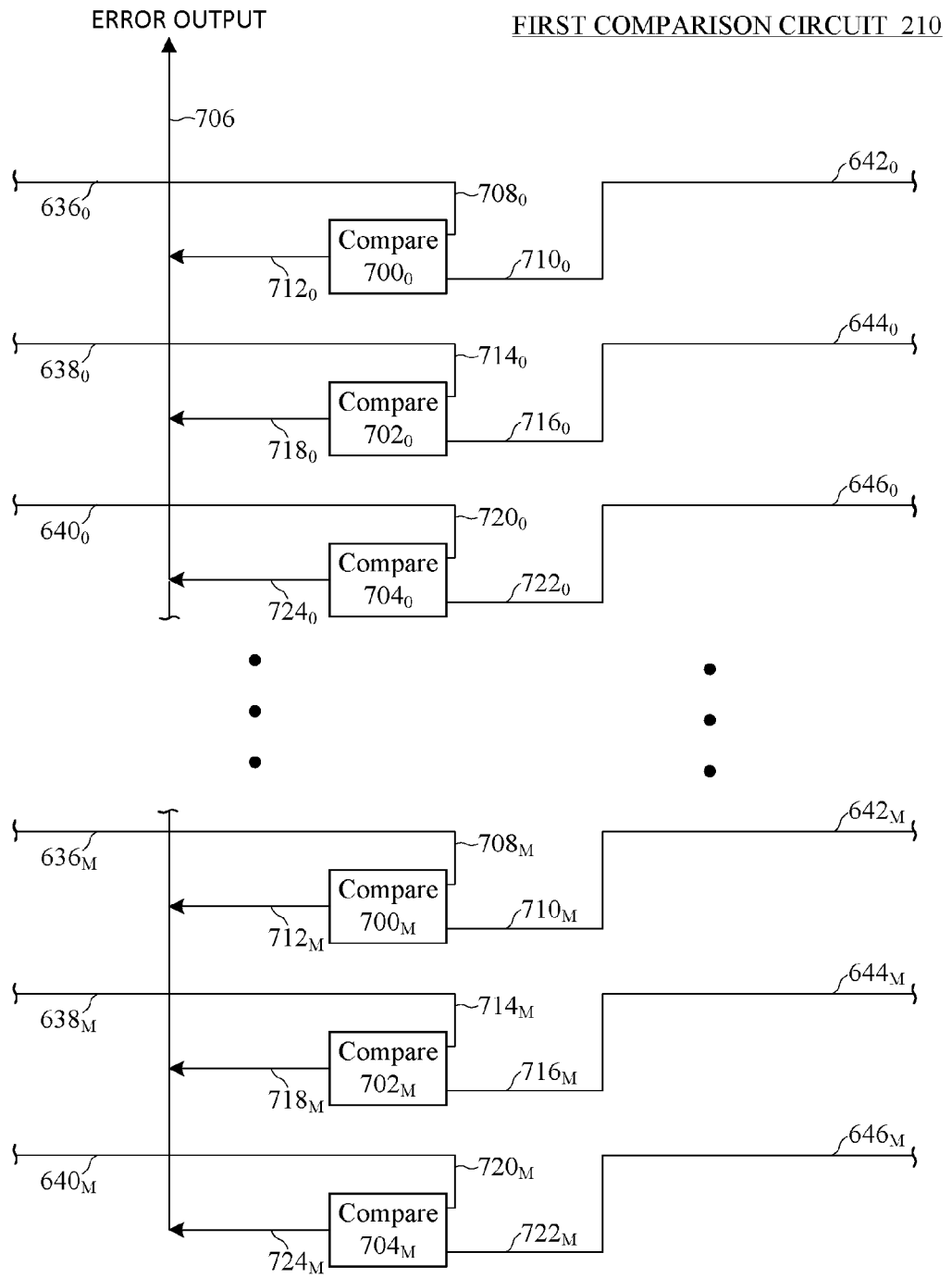
FIG. 7 is a circuit diagram showing features of the comparison circuit of FIG. 6.

FIG. 7 is a circuit diagram showing features of first comparison circuit 210 according to an example embodiment of the invention. First comparison circuit 210 comprises a plurality of compare circuits and an error signal line 706. In the illustrated embodiment, the compare circuits can include XOR gates. In other embodiments of the invention other logic gates such as a NAND or NOR logic gates may be used. If the two inputs to each compare circuit do not have a predetermined relationship (e.g., match), an error signal will be outputted.

In the illustrated embodiment, the sets of compare circuits include compare circuits $700_0$ through $700_M$, $702_0$ through $702_M$, and $704_0$ through $704_M$. Each of compare circuits $700_0$ through $700_M$ includes an associated first input terminal 708, second input terminal 710, and output terminal 712. As shown, each compare circuit 700 and each associated set of terminals 708, 710, and 712 are uniquely denoted with like subscripts. For example, compare circuit $700_{10}$ (not shown) includes first input terminal $708_{10}$, second input terminal $710_{10}$, and output terminal $712_{10}$. First input terminals $708_0$ through $708_M$ are electrically coupled to input terminals $636_0$ through $636_M$, respectively. Second input terminals $710_0$ through $710_M$ are electrically connected to input terminals $642_0$ through $642_M$, respectively. Output terminals $712_0$ through $712_M$ are all electrically coupled to error signal line 706. Each of compare circuits $702_0$ through $702_M$ includes an associated first input terminal 714, second input terminal 716, and output terminal 718.

First input terminals $714_0$ through $714_M$ are electrically coupled to input terminals $638_0$ through $638_M$, respectively. Second input terminals $716_0$ through $716_M$ are electrically coupled to input terminals $644_0$ through $644_M$, respectively. Output terminals $718_0$ through $718_M$ are all electrically coupled to error signal line 706. Each of compare circuits $704_0$ through $704_M$ includes an associated first input terminal 720, second input terminal 722, and output terminal 724. First input terminals $720_0$ through $720_M$ are electrically coupled to input terminals $640_0$ through $640_M$, respectively. Second input terminals $722_0$ through $722_M$ are electrically coupled to input terminals $646_0$ through $646_M$. Output terminals $724_0$ through $724_M$ are all electrically coupled to error signal line 706. It should be recognized that when the first and second input terminals of an associated compare circuit do not correspond, the associated output terminal will output an error signal in the form of a logical high voltage state. With error signal line 706 being connected to all of output terminals $712_0$ through $712_M$, $718_0$ through $718_M$, and $724_0$ through $724_M$, an error signal is outputted if one or more of them has a logical high voltage state. In other embodiments of the invention, each set of compare circuits may be coupled to their own respective error signal line. For example, first comparison circuit 210 may comprise three error signal lines, with one error signal line coupled to all of the output terminals of one set of compare circuits, the output terminal of compare circuits $700_0$ through $700_M$ may be coupled to a first error signal line, while compare circuits $702_0$ through $702_M$ and $704_0$ through $704_M$ may be coupled to a second and a third error signal line, respectively. In yet other embodiments of the invention, a subset of the compare circuits may be coupled to their own respective error signal line. For example, the output terminal of compare circuits $700_0$ through $700_j$, $702_0$ through $702_j$, $704_0$ through $704_j$ may be coupled to a first error signal line, while the output terminal of the remaining compare circuits may be coupled to a second error signal line. In another embodiment of the invention, a subset of each set of compare circuits may be coupled to their own respective error signal line. For example, the output terminals of compare circuits $700_0$ through $700_M$, may be coupled to a first error signal line, while the output terminals of compare circuits $702_{M+1}$ through $702_j$ are coupled to a second error signal line. Similarly, a third, fourth, fifth and sixth error signal line may be coupled to the output terminals of compare circuits $704_0$ through $704_M$, $704_{M+1}$ through $704_j$, $706_0$ through $706_M$ and $706_{M+1}$ through $706_j$.

Figure 8:
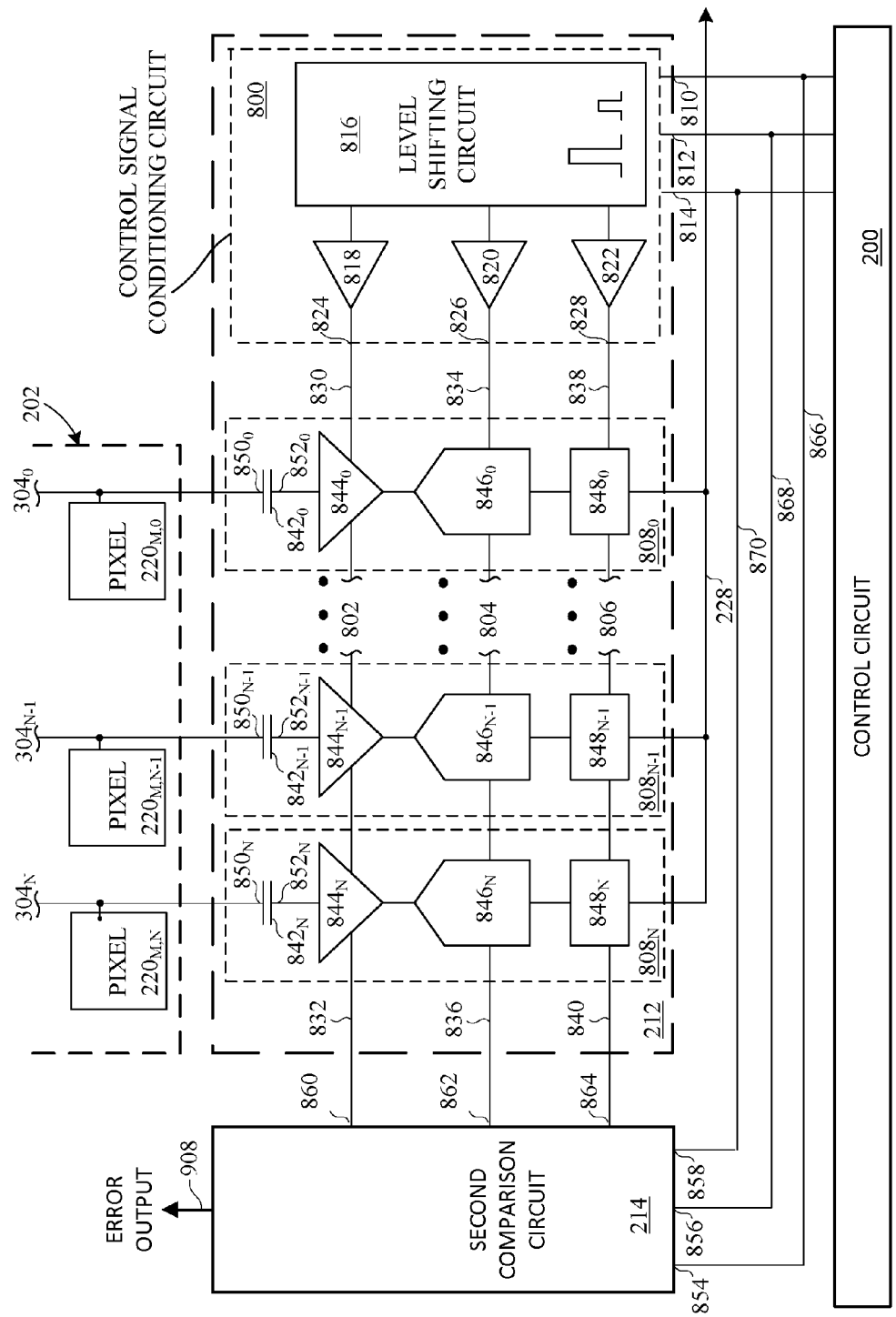
FIG. 8 is a circuit diagram showing the control circuit, pixel array, sampling circuit, and comparison circuit of the image sensor of FIG. 1.

FIG. 8 is a circuit diagram showing control circuit 200, pixel array 202, sampling circuit 212, and second comparison circuit 214. Sampling circuit 212 acquires pixel samples from readout lines $304_0$ through $304_N$ of pixel array 202 and operates according to control signals output from control circuit 200. Accordingly, sampling circuit 212 is coupled to receive control signals from control circuit 200. Second comparison circuit 214 is coupled to both sampling circuit 212 and control circuit 200 and is operative to output an error signal when the control signals from sampling circuit 212 do not correspond with the control signals output from control circuit 200.

Sampling circuit 212 includes a control signal conditioning circuit 800, a first control signal line 802, a second control signal line 804, a third control signal line 806, and a plurality of pixel readout circuits $808_0$ through $808_N$.

Control signal conditioning circuit 800 is operative to condition the control signals output from control circuit 200 before asserting them onto control signal lines 802, 804, and 806. Control signal conditioning circuit 800 includes a first input terminal 810, a second input terminal 812, a third input terminal 814, a level shifting circuit 816, a first buffer circuit 818, a second buffer circuit 820, a third buffer circuit 822, a first output terminal 824, a second output terminal 826, and a third output terminal 828. First input terminal 810 is coupled to receive amplifier control signals output from control circuit 200. Second input terminal 812 is coupled to receive analog-to-digital converter control signals output from control circuit 200. Third input terminal 814 is coupled to receive memory circuit control signals output from control circuit 200. Level shifting circuit 816 is coupled to input terminals 810, 812, and 814 so as to level shift control signals asserted thereon by control circuit 200. First buffer circuit 818 is operative to buffer amplifier control signals asserted on input terminal 810 after they are level shifted by level shifting circuit 816. After being buffered by buffer circuit 818, amplifier control signals are asserted on control signal line 802 from output terminal 824. Second buffer circuit 820 is operative to buffer analog-to-digital converter control signals asserted on input terminal 812 after they are level shifted by level shifting circuit 816. After being buffered by buffer circuit 820, analog-to-digital converter control signals are asserted on control signal line 804 from output terminal 826. Third buffer circuit 822 is operative to buffer memory circuit control signals asserted on input terminal 814 after they are level shifted by level shifting circuit 816. After being buffered by buffer circuit 822, memory circuit control signals are asserted on control signal line 806 from output terminal 828.

Control signal line 802 includes a first end 830 and a second 832, control signal line 804 includes a first end 834 and a second end 836, and control signal line 806 includes a first end 838 and a second end 840. Control signal line 802 is an amplifier control signal line operative to supply amplifier control signals to pixel readout circuits $808_0$ through $808_N$. First end 830 and second end 832 of control signal line 802 are coupled to output terminal 824 of control signal conditioning circuit 800 and second comparison circuit 214, respectively. Control signal line 804 is an analog-to-digital converter control signal line operative to supply analog-to-digital converter control signals to pixel readout circuits $808_0$ through $808_N$. First end 834 and second end 836 of control signal line 804 are coupled to output terminal 826 of control signal conditioning circuit 800 and second comparison circuit 214, respectively. Control signal line 806 is a memory circuit control signal line operative to supply memory circuit control signals to pixel readout circuits $808_0$ through $808_N$. First end 838 and second end 840 of control signal line 806 are coupled to output terminal 828 of control signal conditioning circuit 800 and second comparison circuit 214, respectively.

Each of pixel readout circuits $808_0$ through $808_N$ is operative to acquire digital data indicative of the electrical state of a respective one of readout lines $304_0$ through $304_N$. For example, pixel readout circuit $808_{N-1}$ is operative to acquire digital data indicative of the electrical state of readout line $304_{N-1}$. Each of pixel readout circuits $808_0$ through $808_N$ includes a capacitor 842, an amplifier 844, an analog-to-digital converter 846, and a memory circuit 848. Each of capacitors $842_0$ through $842_N$ includes a first terminal 850 and a second terminal 852 coupled to a corresponding readout line 304 and amplifier 844, respectively. Each of amplifiers $844_0$ through $844_N$ is operative to amplify the electrical state of corresponding second terminals $852_0$ through $852_N$. Each of amplifiers $844_0$ through $844_N$ are coupled to control signal line 802 and, operates according to amplify control signals (e.g. gain control signals) output from terminal 824 of control signal conditioning circuit 800.

Analog-to-digital converters $846_0$ through $846_N$ are coupled to respective amplifiers $844_o$ through $844_N$ and are operative to digitize amplified signals output therefrom. For example, analog-to-digital converter $846_N$ generates a binary data word indicative of the amplified voltage output from amplifier $844_N$. Each of analog-to-digital converters $846_0$ through $846_N$ are coupled to control signal line 804 and, operates according to analog-to-digital control signals output from terminal 826 of control signal conditioning circuit 800. Memory circuits $848_0$ through $848_N$ are coupled to analog-to-digital converters $846_0$ through $846_N$, respectively, and are operative to store the binary data words generated therefrom. Memory circuits $848_0$ through $848_N$ are coupled to control signal line 806 and, therefore, operate according to memory circuit control signals output from terminal 828 of control signal conditioning circuit 800. Those skilled in the art will recognize that the number of data bits and, resolution of the binary data words acquired by readout circuits $808_0$ through $808_N$ will depend on the particular application. Accordingly, the resolution (e.g., 8-bit word) is not an essential aspect of the present invention and, therefore, need not be limited to any specific number of data bits or the type of analog-to-digital converter, such as successive approximate register or ramp analog-to-digital conversion.

Second comparison circuit 214 includes a first input terminal 854, a second input terminal 856, a third input terminal 858, a fourth input terminal 860, a fifth input terminal 862, a sixth input terminal 864. First input terminal 854 is coupled to receive the same amplifier control signals supplied to input terminal 810 of control signal conditioning circuit. In the illustrated embodiment, first input terminal 854 of second comparison circuit 214 and input terminal 810 of control signal conditioning circuit 800 are connected via a transit line 866 and are, therefore, both coupled to the same node. Second input terminal 856 is coupled to receive the same analog-to-digital control signals supplied to input terminal 812 of control signal conditioning circuit 800 from control circuit 200. In the illustrated embodiment, input terminal 856 of second comparison circuit 214 and input terminal 812 of control signal conditioning circuit 800 are connected via a transit line 868 and are, therefore, both connected to the same node. Third input terminal 858 is connected to receive the same memory circuit control signals supplied to input terminal 814 of control signal conditioning circuit 800 from control circuit 200. In the example embodiment, input terminal 858 of second comparison circuit 214 and input terminal 814 of control signal conditioning circuit 800 are connected via a transit line 870 and are, therefore, both connected to the same node.

Fourth input terminal 860 is coupled to second end 832 of control signal line 802. Fifth input terminal 862 is coupled to second end 836 of control signal line 804. Sixth input terminal 864 is connected to second end 840 of control signal line 806. During operation, second comparison circuit 214 compares the electrical states of input terminals 854, 856, and 858 with the electrical states of input terminals 860, 862, and 864, respectively. If the electrical states of input terminals 854, 856, and 858 do not correspond to those of respective input terminals 860, 862, and 864, comparison circuit outputs an error signal.

Figure 9:
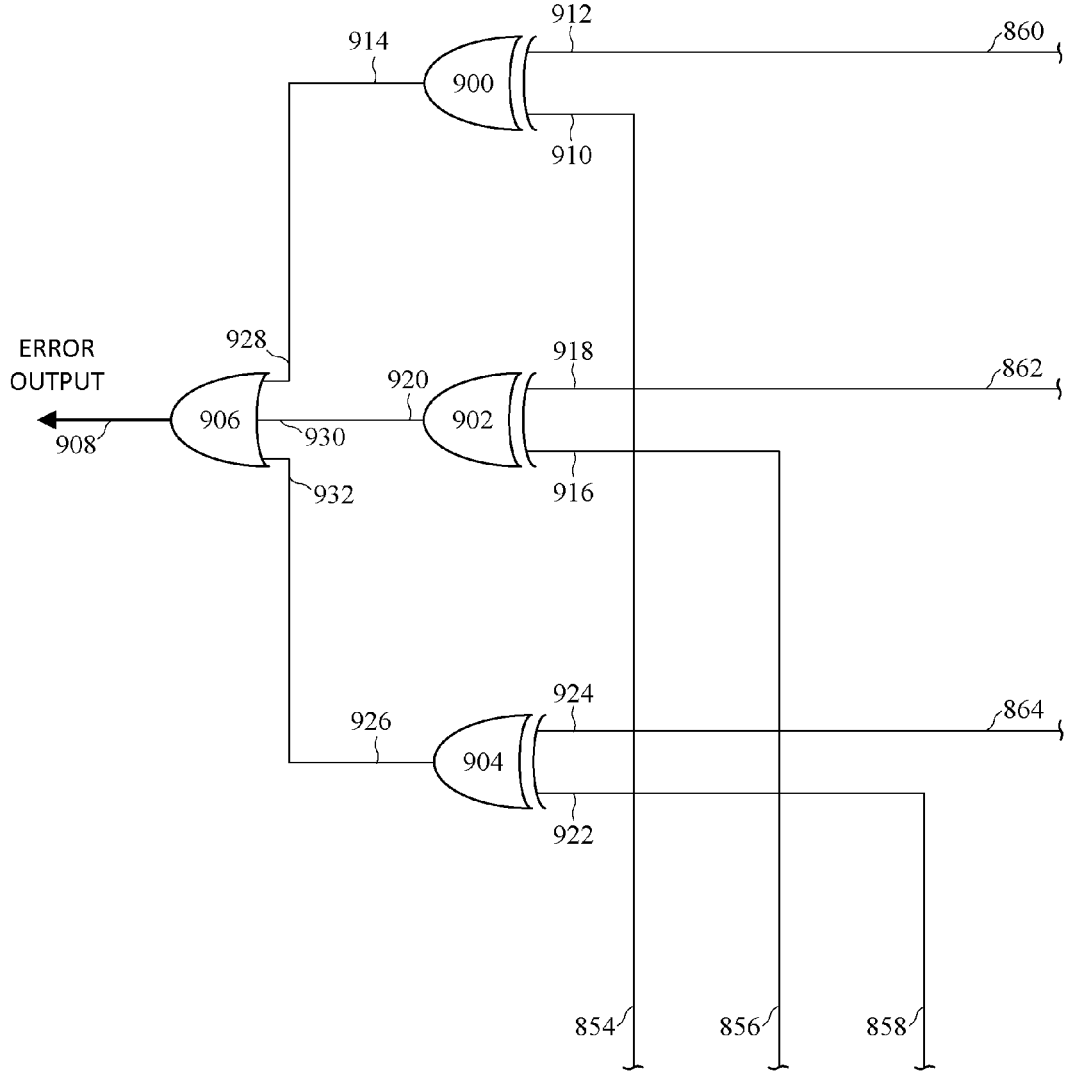
FIG. 9 is a circuit diagram showing additional details of the comparison circuit of FIG. 8.

FIG. 9 is a circuit diagram showing additional details of second comparison circuit 214 according to one embodiment of the present invention. Second comparison circuit 214 comprises a plurality of logic gates and an error signal output terminal 908. In the illustrated embodiment, second comparison circuit 214 comprise a plurality of XOR gates and an OR gate. In other embodiments of the invention, other logic gates such as XNOR or NOR logic gates may be used. With an OR gate, if any of the plurality of input terminals is at a logical high, the output will be a logical high.

Second comparison circuit 214 comprises a first XOR gate 900, a second XOR gate 902, a third XOR gate 904, an OR gate 906, and an error signal output terminal 908. First XOR gate 900 includes a first input terminal 910, a second input terminal 912, and an output terminal 914. Input terminals 910 and 912 of XOR gate 900 are coupled to terminals 854 and 860, respectively. Accordingly, the logic state of output terminal 914 is low when input terminals 910 and 912 are either both logical high or both logical low, thus indicating that the amplifier control signals asserted on control line 802 are being properly distributed to all of amplifiers 844$_0$ through 844$_N$. If the control signals supplied to input terminal 810 of control signal conditioning circuit 800 are not properly distributed across control line 802 to input terminal 860, input terminal 910 will not have the same logical value as input terminal 912 thereby causing output terminal 914 to have a high logic state.

Second XOR gate 902 includes a first input terminal 916, a second input terminal 918, and an output terminal 920. Input terminals 916 and 918 of XOR gate 902 are coupled to terminals 856 and 862, respectively. The logic state of output terminal 920 is low when input terminals 916 and 918 are either both logical high or both logical low, thus indicating that the analog-to-digital converter control signals asserted on control line 804 are being properly distributed to all of analog-to-digital converters 846$_0$ through 846$_N$. If the control signals supplied to input terminal 812 of control signal condition circuit 800 are not properly distributed across control line 804 to input terminal 862, input terminals 918 and 916 will not match, thus causing output terminal 920 to have a high logic state.

Third XOR gate 904 includes a first input terminal 922, a second input terminal 924, and an output terminal 926. Input terminals 922 and 924 of XOR gate 904 are coupled to terminals 858 and 864, respectively. The logic state of output terminal 926 is low when input terminals 922 and 924 match, thus indicating that the memory circuit control signals asserted on control line 806 are being properly distributed to all of memory circuits 848$_0$ through 848$_N$. If the control signals supplied to input terminal 814 of control signal conditioning circuit 800 are not properly distributed across control line 806 to input terminal 864, input terminals 924 and 922 will not match, thus causing output terminal 926 to have a high logic state.

OR gate 906 includes a first input terminal 928, a second input terminal 930, a third input terminal 932, and an output terminal 908. Input terminals 928, 930, and 932 are coupled to output terminals 914, 920, and 926, respectively. The logic state of output terminal 908 will be low when the logic state of output terminals 914, 920, and 926 are all low. If the logic state of one or more of output terminals 914, 920, and 926 are high, output terminal 908 will have a high logic state indicating that some type of failure has occurred in sampling circuit 212.

In the illustrated embodiment, XOR gates are used. In other embodiments of the invention other logic gates such as a NAND or NOR logic gates may be used. With an XOR gate, if the two inputs do not match, a logical high will be outputted.

Figure 10:
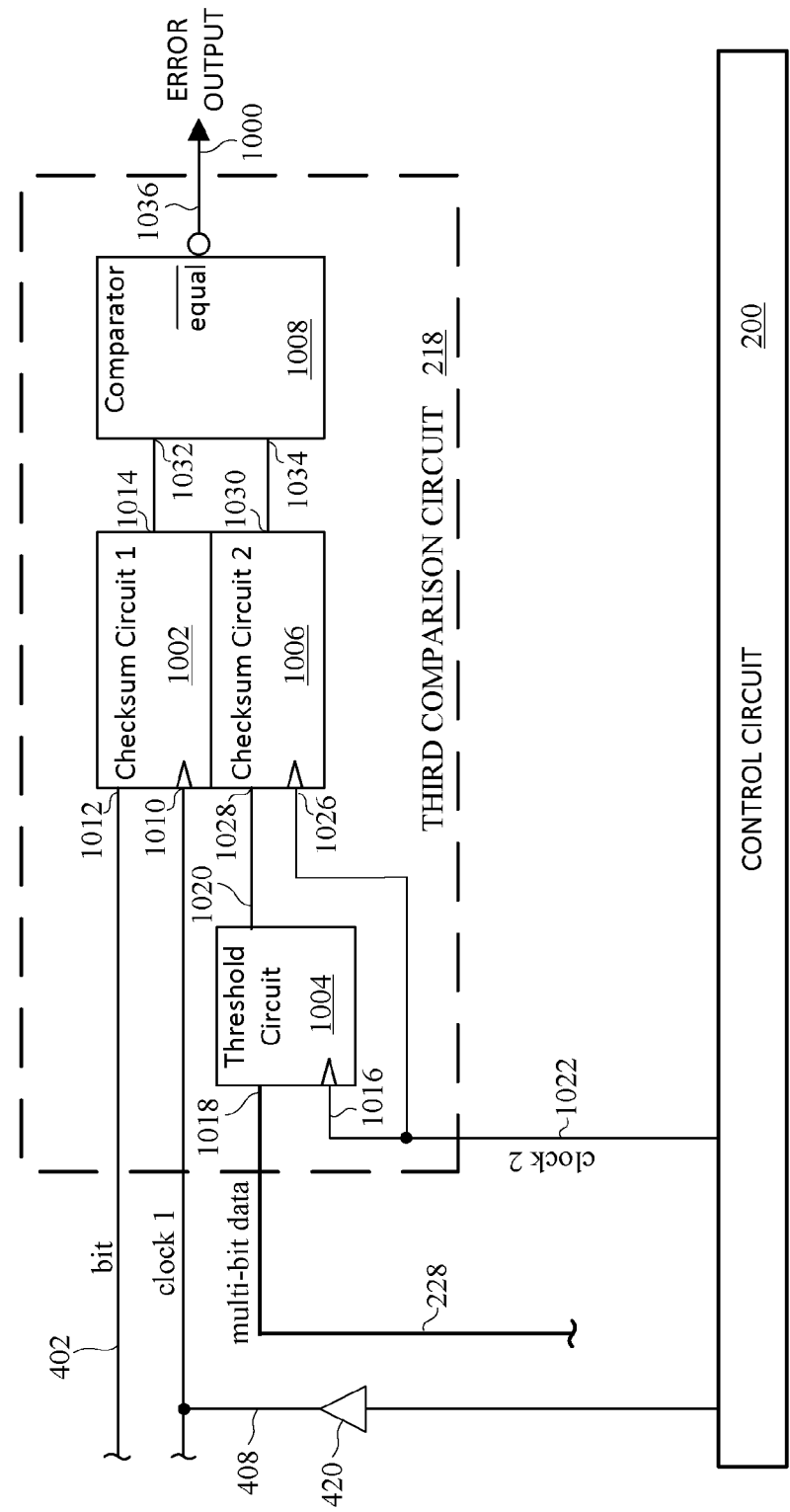
FIG. 10 is a circuit diagram of another comparison circuit of the image sensor of FIG. 1.

FIG. 10 is a circuit diagram of third comparison circuit 218 (FIG. 2) according to one embodiment of the present invention. When image sensor 100 operates in test mode, third comparison circuit 218 compares the test signals provided by random bit generator 400 via random bit supply line 402 (which should also be provided by the column injection circuits 226$_0$ through 226$_N$ to the pixels 202 and then sampled from the pixels 202 by sampling circuit 212) with the digital data actually acquired by sampling circuit 212. In the event that the acquired data does not match the test data, third comparison circuit 218 outputs an error signal from an error signal output terminal 1000. In the illustrated embodiment, third comparison circuit 218 comprises a first checksum circuit 1002, a threshold circuit 1004, a second checksum circuit 1006, and a comparator 1008.

First checksum circuit 1002 includes a clock input terminal 1010, a data-bit input terminal 1012, and an output terminal 1014. Clock input terminal 1010 and data-bit input terminal 1012 are coupled to buffered clock signal line 408 and random bit supply line 402, respectively. Buffer 420 is coupled between control circuit 200 and buffered clock signal line 408 to buffer and/or amplify the clock signal from control circuit 200. The clock signals asserted on buffered clock signal line 408 cause first checksum circuit 1002 to sequentially read, via input terminal 1012, the randomly generated data bits that are sequentially asserted on random bit supply line 402 by random bit generator 400 (refer to FIG. 4). As the randomly generated bits are sequentially received by first checksum circuit 1002, first checksum circuit 1002 calculates a checksum value that is output to comparator 1008 through output terminal 1014.

Threshold circuit 1004 includes a clock input terminal 1016, a data input terminal 1018, and an output terminal 1020. Clock input terminal 1016 is coupled to a second clock signal line 1022 to receive clock signals from control circuit 200. Data input terminal 1018 is coupled to data lines 228 to receive pixel data acquired by sampling circuit 212. The pixel data is processed and supplied to terminal 1018 from image processor 216, via data lines 228, in the form of binary data words, each word being indicative of the charge state of a particular pixel. Alternatively, the pixel data can be supplied to terminal 1018 directly from sampling circuit 212 in the form of binary data words. Each time a data word is loaded into threshold circuit 1004, a single data-bit is output from terminal 1020. If the binary value of the data word received via terminal 1018 is below a predetermined threshold value, threshold circuit 1004 outputs a binary "0" from terminal 1020. Threshold circuit 1004 outputs a binary "1" from output terminal 1020 if the binary value of the data word received via input terminal 1018 is greater than, or equal to, the predetermined threshold value. Accordingly, each time clock signal line 1022 cycles, threshold circuit 1004 receives another data word and outputs another data bit corresponding thereto.

Second checksum circuit 1006 includes a clock input terminal 1026, a data-bit input terminal 1028, and an output terminal 1030. Clock input terminal 1026 and data-bit input terminal 1028 of second checksum circuit 1006 are coupled to second clock signal line 1022 and output terminal 1020 of threshold circuit 1004, respectively. Accordingly, each time clock signal line 1022 cycles, second checksum circuit 1006 receives another data bit output from threshold circuit 1004. As the randomly generated bits are sequentially received by input terminal 1028, first checksum circuit 1006 calculates a checksum value that is output to comparator 1008 through output terminal 1030.

Comparator 1008 includes a first input terminal 1032, a second input terminal 1034, and an output terminal 1036. First input terminal 1032 and second input terminal 1034 are coupled to receive binary checksum values output from terminals 1014 and 1030, respectively. Output terminal 1036 of comparator 1008 is connected to error signal output terminal 1000. If the checksum value received by input terminal 1034 is not equal to the checksum value received by input terminal 1032, output terminal 1036 asserts an error signal onto error signal output terminal 1000. The checksums can be calculated for each row or over an entire frame, but checking each row provides the advantage of identifying a particular defective row.

Figure 11:
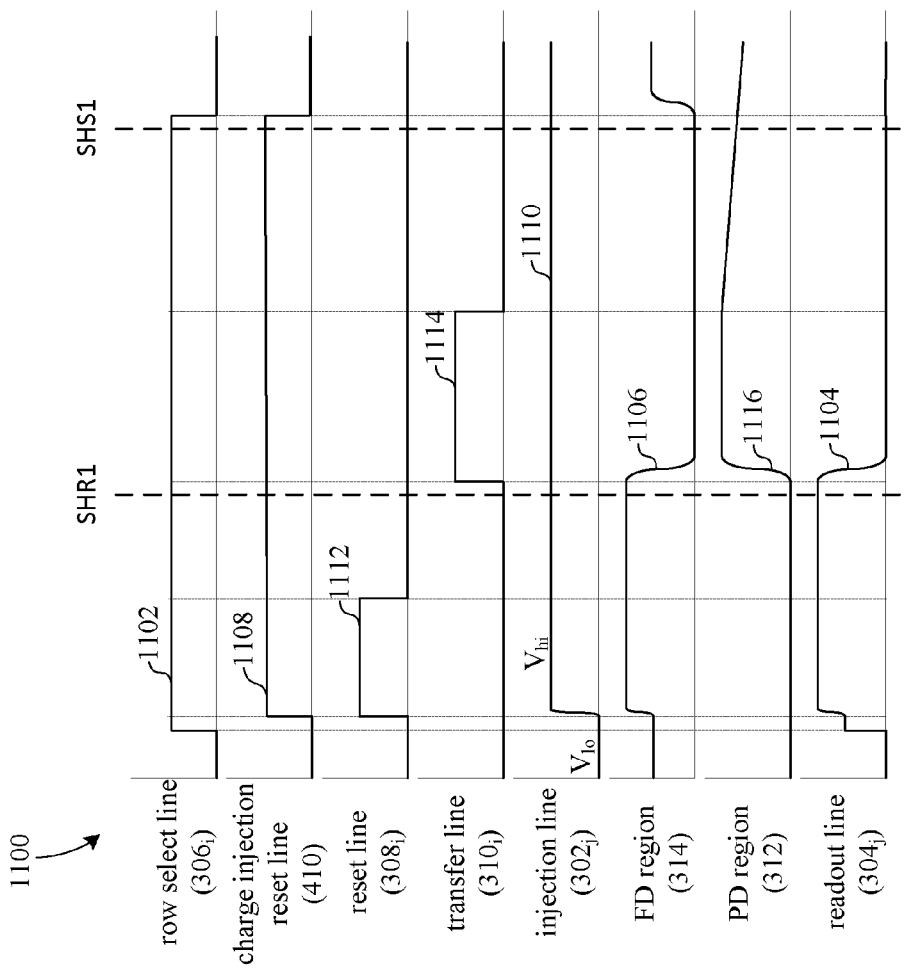
FIG. 11 is a timing diagram illustrating the operation of the image sensor of FIG. 1 while in image capture mode.

FIG. 11 is an example timing diagram 1100 illustrating the operation of image sensor 100 while in image capture mode. The following example describes the control and sampling of row 222, while image sensor 100 operates in image capture mode. In addition, the example illustrates the electrical states of various elements of pixel $220_{i,j}$ in response to the control of row $222_j$. Although the operation of only row $222_i$ is described in this example, all of rows $222_0$ through $222_M$ are controlled and sampled sequentially in the same manner. The operation of image sensor 100 will be described with reference also to FIGS. 2 through 10.

After acquiring image data for row $222_{i-1}$, image data for row $222_i$ is acquired as follows. Initially, control circuit 200 outputs a set of row control instructions (e.g., row address for row i) to both row controllers 206 and 208. Responsive to the row control instructions, row controller 206 asserts a row select signal 1102 on row select line $306_i$ thus causing row select transistor 324 of pixels $220_{i,0}$ through $220_{i,N}$ to operate in a conducting state. Once row select transistor 324 of, for example, pixel $220_{i,j}$ is in a conducting state, the voltage state 1104 of associated readout line $304_j$ corresponds to the charge state 1106 of charge storage (FD) region $314_{i,j}$.

In this example embodiment, voltage supply line 404 provides the reference voltage (Vhi) 1110 at which injection lines $302_0$ through $302_N$ are held while image sensor 100 operates in image capture mode. The high voltage state of charge injection reset signal line 410 causes each of switch circuits $502_0$ through $502_N$ (FIG. 5) to couple high voltage supply line 404 to a respective one of charge injection lines 302. Thus, all of injection lines $302_0$ through $302_N$ (i.e., all injection lines to pixels 220 in row i) are coupled to high voltage supply line 404.

At the same time that reset signal 1108 is asserted on charge injection reset signal line 410, a pixel reset signal 1112 is asserted on reset line 308, thus actuating reset transistor 318 of each associated one of pixels $220_{i,0}$ through $220_{i,N}$. As previously mentioned, actuating transistor 318 couples the associated charge storage (FD) region 314 to voltage source terminal 316 (Vdd). Reset signal 1112 remains asserted on reset line 308, for a predetermined time duration sufficient to allow any charge previously accumulated in charge storage regions 314 to return to a known reset state.

After reset signal 1112 is removed (e.g., goes low) from reset line $308_i$, sampling circuit 212 simultaneously acquires a voltage sample from each of readout lines $304_0$ through $304_N$. The time at which the first voltage samples are acquired is indicated by a dashed line denoted SHR1 (Sample-Hold-Reset 1). Shortly after SHR1, a transfer signal 1114 is asserted on transfer line $310_i$ thus actuating transfer transistor 320 of each associated one of pixels $220_{i,0}$ through $220_{i,N}$. The actuation of transfer transistor 320 results in an electrical coupling and, therefore, a transfer of charge from photosensor 312 to charge storage (FD) region 314. As shown, for example, the initial low charge state 1116 of photosensor $312_{i,j}$ and the initial high charge state 1106 of charge storage region $314_{i,j}$ simultaneously increase and decrease, respectively, upon asserting signal 1114 on transfer line $310_i$. Transfer signal 1114 remains asserted on transfer line $310_i$ for a predetermined time duration sufficient to allow any charge generated by photosensor $312_{i,j}$ to transfer to charge storage region $314_{i,j}$. After transfer signal 114 is removed from transfer line $310_i$, sampling circuit 212 simultaneously acquires a second voltage sample from each of readout lines $304_0$ through $304_N$. The time at which the second voltage samples are acquired is indicated by a dashed line denoted SHS1 (Sample-Hold-Signal 1). Finally, row select signal 1102 is removed from row select line 306, and the aforementioned process is repeated for row $222_{i+1}$.

Figure 12:
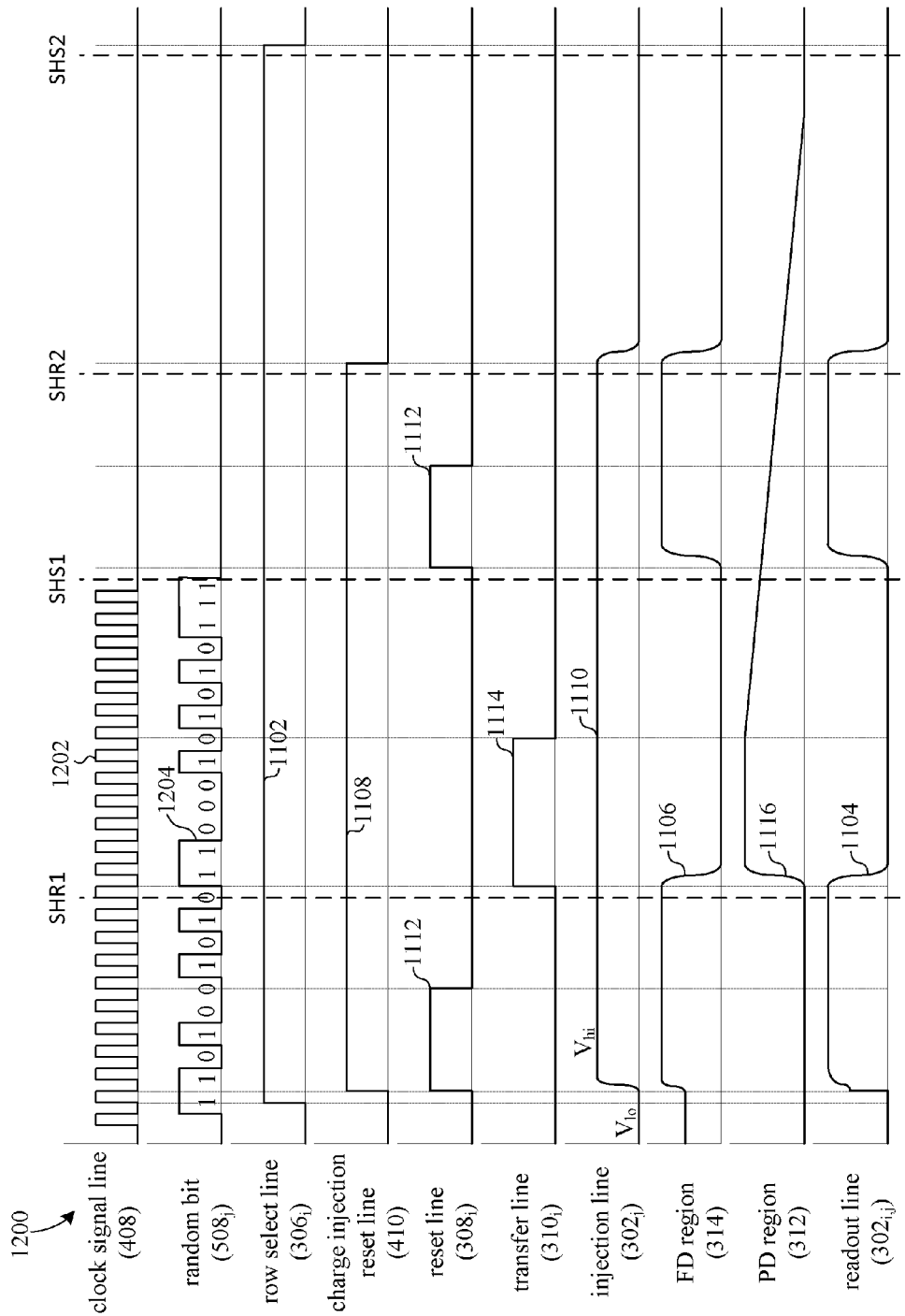
FIG. 12 is a timing diagram illustrating the operation of the image sensor of FIG. 1 while in test mode.

FIG. 12 is a timing diagram 1200 illustrating an example of the operation of image sensor 100 in test mode. In particular, timing diagram 1200 shows an image capture process (before SHS1) followed by a test process (after SHS1). The following description explains the control and sampling of row 222, and illustrates the electrical states of various elements of pixel $220_{i,j}$ in response to the control of row $222_j$. Although the operation of only row 222, is described in this example, all of rows $222_o$ through $222_M$ are controlled and sampled sequentially in a similar manner. The following description also references FIGS. 2-10.

In effort to convey the novel features of the present invention in a simplified manner, image sensor 100 is described as having only 24 pixel columns. However, it should be apparent to those skilled in the art that in a typical application image sensor 100 would likely have a substantially greater number of pixel columns. However, the present invention can be practiced with image sensor 100 having any practical number of pixel columns and/or rows.

Initially, control circuit 200 begins asserting a sequence of clock signals 1202 on clock signal line 408. The number of cycles in clock signal 1202 is equal to the number of pixel columns 224 of image sensor 100. Because this particular example describes image sensor 100 as having 24 pixel columns 224, there are 24 cycles in the illustrated portion of clock signal 1202. At each falling edge of clock signal 1202, random bit generator 400 asserts a new randomly generated bit on random bit line 402. Thus, random bit generator 400 asserts a sequence of 24 randomly generated bits on random bit line 402. Each time a new randomly generated bit is asserted on random bit line 402, the bit previously stored at data input terminal 508 of memory element $500_{j+1}$ is shifted to data input terminal 508 of memory element $500_j$. Thus, a sequence of 24 bits 1204 is shifted into the 24 memory elements $500_0$ through $500_{23}$ (only two of the memory elements 500 are shown). Starting with the $1^{st}$ and ending with the $24^{th}$, the sequence of 24 bits 1204 shown in this example is 110100101011000101010111.

After the $1^{st}$ of bits 1204 is shifted into memory element $500_j$, row select signal 1102 is asserted on row select signal line $306_i$ thus connecting charge storage regions 314 of pixels $220_{i,0}$ through $220_{i,23}$ to respective readout lines $304_0$ through $304_{23}$. Shortly after row select signal 1102 is asserted on row select line $306_i$ reset signal 1108 is asserted on charge injection reset signal line 410 of test signal injection circuit 204. The logical high voltage state of charge injection reset signal line 410 causes each of switch circuits $502_0$ through $502_{23}$ to couple terminals $518_0$ through $518_{23}$ to terminals $514_0$ through $514_{23}$, respectively. As a result, injection lines $302_0$ through $302_{23}$ all couple to high voltage supply line 404. At the same time that reset signal 1108 is asserted on charge injection reset signal line 410, pixel reset signal 1112 is asserted on reset line 308, thus coupling charge storage regions $314_{i,0}$ through $314_{i,23}$ to voltage source terminals 316 in each associated one of pixels $220_{i,0}$ through $220_{i,23}$. After each of charge storage regions $314_{i,0}$ through $314_{i,23}$ returns to a known reset charge state, reset signal 1112 is removed (goes low) from reset line $308_i$.

After reset signal 1112 is removed from reset line $308_i$, sampling circuit 212 simultaneously acquires a voltage sample from each of readout lines $304_0$ through $304_{23}$. As in image capture mode, the first voltage samples (reset voltage samples) are acquired at SHR1. Shortly after SHR1, transfer signal 1114 is asserted on transfer line 310, thus transferring the charge from photosensors $312_{i,0}$ through $312_{i,23}$ to charge storage regions $314_{i,0}$ through $314_{i,23}$, respectively. Then, transfer signal 1114 is removed (goes low) from transfer line $310_i$ and sampling circuit 212 simultaneously acquires the second voltage sample (the image signal) from each of readout lines $304_0$ through $304_{23}$ at SHS1. This completes the image capture process.

Shortly after SHS1, reset signal 1112 is again asserted on reset line $308_i$ thus resetting the charge state 1106 of charge storage regions $314_{i,0}$ through $314_{i,N}$. After reset signal 1112 is removed from reset line 308, for the second time, sampling circuit 212 simultaneously acquires a third voltage sample from each of readout lines $304_0$ through $304_{23}$ at SHR2. After SHR2, reset signal 1108 is removed from charge injection reset signal line 410 thus causing switch circuits $502_0$ through $502_N$ to electrically couple terminals $516_0$ through $516_N$ with terminals $518_0$ through $518_N$, respectively. As a result, the voltage 1110 of each test signal injection line $302_0$ through $302_N$ is dictated by the logic state of whichever one of bits 1204 happens to be asserted on respective terminals $520_0$ through $520_N$. For example, when the bit 1204 asserted on terminal $508_j$ of memory element $500_j$ happens to be a "0", switch circuit $504_j$ of column injection circuit $226_j$ electrically couples terminals $526_j$ and $522_j$. Coupling terminals $526_j$ and $522_j$ causes injection line $302_j$ to couple to logical high voltage supply line 404 indirectly through switch circuits $502_j$ and $504_j$. On the other hand, when the bit 1204 asserted on terminal $508_j$ of memory element $500_j$ happens to be a "1", switch circuit $504_j$ of column injection circuit $226_j$ couples terminals $526_j$ and $524_j$. As a result of coupling terminals $526_j$ and $524_j$, injection line $302_j$ connects to logical low voltage line 406 indirectly through switch circuits $502_j$ and $504_j$. In this particular example, however, the $24^{th}$ bit 1204 stored in terminal $508_j$ is a "1", thus causing voltage 1110 of injection line $302_j$ to drop down to the logical low voltage of low voltage supply line 406 when reset signal 1108 is removed from charge injection reset signal line 410. Of course, if the $24^{th}$ bit 1204 happened to be a "0" instead of "1", the voltage 1110 of injection line $302_j$ would have remained at the level of logical high voltage line 404 upon removal of reset signal 1108 from charge injection reset signal line 410.

Unlike when image sensor 100 operates in image capture mode, a second transfer signal 1114 is not asserted on transfer line $310_j$ after SHR2 when image sensor 100 operates in test mode. Indeed, the charge states of pixels $220_{i,0}$ through $220_{i,23}$ are not dictated by incident light intensity (i.e., not by photogenerated charge accumulated by photosensors $312_{i,0}$ through $312_{i,N}$). Rather, the charge states of pixels $220_{i,0}$ through $220_{i,23}$ are dictated by the voltage states of injection lines $302_0$ through $302_j$, respectively. Because each of injection lines $302_0$ through $302_j$ can have only one of the two possible voltage states (Vhi or Vlo), each of the voltage samples acquired from respective readout lines $304_0$ through $304_j$ during SHR2 can have only one of two possible values. In effect, sampling circuit 212 samples simulated pixel data that is injected into pixels $220_{i,0}$ through $220_{i,N}$ by replacing the step of transferring photogenerated charge from photosensors $312_{i,0}$ through $312_{i,N}$ into respective charge storage regions $314_{i,0}$ through $314_{i,N}$ with a step of injecting randomly generated test signals into charge storage regions $314_{i,0}$ through $314_{i,N}$.

It is not necessary to follow every image capture process with a test process. How often the test process (injected signal sampling) is implemented depends on how fast a sensor failure must be detected. In general, a test process can follow every Nth image capture process, where N is an integer greater than zero. Optionally, only a subset of pixel rows 222 can be tested during each frame time (i.e., the time for completing an image capture process for every row 222 in pixel array 202).

Figure 13:
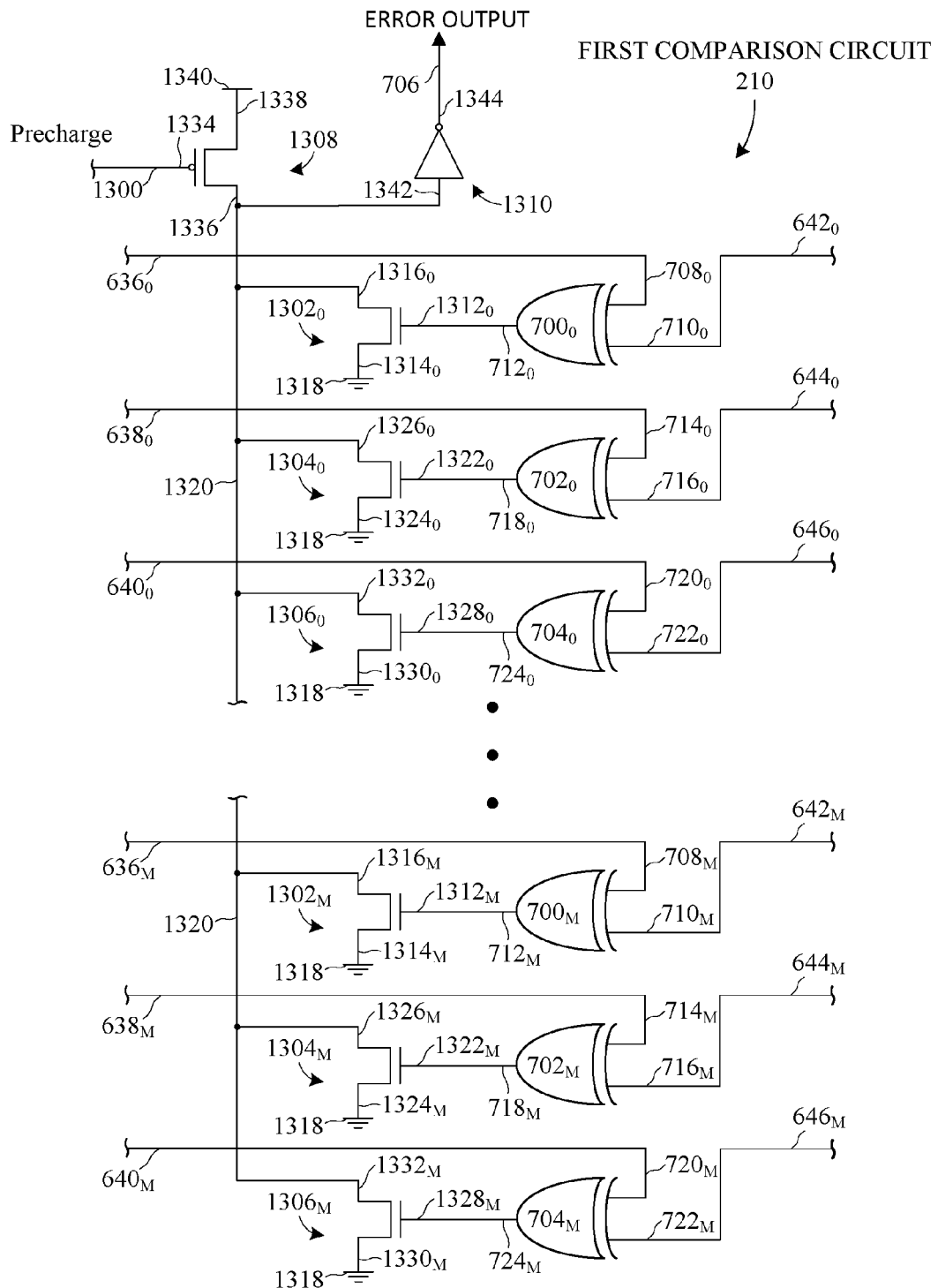
FIG. 13 is a circuit diagram of the comparison circuit of FIG. 7 according to an alternate embodiment of the present invention.

FIG. 13 is a circuit diagram of first comparison circuit 210 according to an alternate embodiment of the present invention. In this particular embodiment, first comparison circuit 210 (FIG. 2) is configured to be selectively enabled and disabled according to control signals asserted on an additional input terminal 1300 thereof. One advantage to selectively enabling and disabling first comparison circuit 210 is that first comparison circuit 210 can be disabled when not in use, thus reducing the overall power consumption of image sensor 100. In certain applications, it may only be necessary to carry out a comparison routine once per several frames in order to achieve some predetermined image data reliability. In such a case, it might be desirable to disable first comparison circuit 210 during the frames in which control signals need not be validated.

To implement selective control, first comparison circuit 210 further includes a plurality of transistors $1302_0$ through $1302_M$, a second plurality of transistors $1304_0$ through $1304_M$, a third plurality of transistors $1306_0$ through $1306_M$, an enable transistor 1308, and an inverter 1310. Each of transistors $1302_0$ through $1302_M$ includes a first terminal 1312, a second terminal 1314, and a third terminal 1316. As shown, each of terminals 1312, 1314, and 1316 are denoted with a subscript identifying the associated one of transistors $1302_0$ through $1302_M$ to which it belongs. Terminals $1312_0$ through $1312_M$ are connected to terminals $712_0$ through $712_M$, respectively. All of terminals $1314_0$ through $1314_M$ of respective transistors $1302_0$ through $1302_M$ are connected to a ground terminal 1318 of first comparison circuit 210. All of terminals $1316_0$ through $1316_M$ of respective transistors $1302_0$ through $1302_M$ are connected to a common supply line 1320 of first comparison circuit 210.

Each of transistors $1304_0$ through $1304_M$ also includes a first terminal 1322, a second terminal 1324, and a third terminal 1326. As shown, each of terminals 1322, 1324, and 1326 are also denoted with a subscript identifying the associate one of transistors $1304_0$ through $1304_M$ to which it belongs. Terminals $1322_0$ through $1322_M$ are connected to terminals $718_0$ through $718_M$, respectively. All of terminals $1324_0$ through $1324_M$ of respective transistors $1304_0$ through $1304_M$ are connected to ground terminal 1318 of first comparison circuit 210. All of terminals $1326_0$ through $1326_M$ of respective transistors $1304_0$ through $1304_M$ are connected to common supply line 1320 of first comparison circuit 210.

Each of transistors $1306_0$ through $1306_N$ also includes a first terminal 1328, a second terminal 1330, and a third terminal 1332. As shown, each of terminals 1328, 1330, and 1332 are also denoted with a subscript identifying the associate one of transistors $1306_0$ through $1306_M$ to which it belongs. Terminals $1328_0$ through $1328_M$ are connected to terminals $724_0$ through $724_M$, respectively. All of terminals $1330_0$ through $1330_M$ of respective transistors $1306_0$ through $1306_M$ are connected to ground terminal 1318 of first comparison circuit 210. All of terminals $1332_0$ through $1332_M$ of respective transistors $1306_0$ through $1306_M$ are connected to common supply line 1320 of first comparison circuit 210.

Transistor 1308 includes a first terminal 1334 connected to input terminal 1300 of first comparison circuit 210, a second terminal 1336 connected to common supply line 1320, and a third terminal 1338 connected to a voltage source 1340 of first comparison circuit 210. Inverter 1310 includes an input terminal 1342 connected to common supply line 1320 and an output terminal 1344 connected to error signal output line 706 of first comparison circuit 210.

The following example describes the operation of first comparison circuit 210 according to this alternate embodiment. Initially, terminal 1300 is at a low voltage state thus actuating transistor 1308. When transistor 1308 is actuated, no voltage drop occurs between terminals 1338 and 1336 and, therefore, the voltage state of the node that includes line 1320 and input terminal 1342 of inverter 1310 is equal to the high voltage state of voltage source 1340. Of course, with input terminal 1342 of inverter 1310 at a high voltage state, output terminal 1344 is at a low voltage state. To enable first comparison circuit 210, an enable signal is asserted on terminal 1300 in the form of a high voltage state. This causes transistor 1308 to be in a nonconducting state ("turned off"), thus disconnecting line 1320 and input terminal 1342 of inverter 1310 from voltage source 1340. After transistor 1308 is turned off, the voltage state of line 1320 and input terminal 1342 of inverter 1310 remain precharged to the high voltage state. If any one or more of XOR gates $700_0$ through $700_M$, $702_0$ through $702_M$, and/or $704_0$ through $704_M$ have noncorresponding input terminals, the associated output terminal will have a high voltage state, thus actuating (place in a conducting state) whichever one of transistors $1302_0$ through $1302_M$, $1304_0$ through $1304_M$, or $1306_0$ through $1306_M$ has a gate connected thereto. The actuation of any one or more of transistors $1302_0$ through $1302_M$, $1304_0$ through $1304_M$, or $1306_0$ through $1306_M$ will couple line 1320 and input terminal 1342 of inverter 1310 to ground terminal 1318. As a result, input terminal 1342 of inverter 1310 causes output terminal 1344 and, therefore, error output signal line 706 to have a high voltage state. Of course, the high voltage state of error signal line 706 is the error signal that indicates one or more control signals have not been properly distributed to control signal lines $300_0$ through $300_M$.

Figure 14:
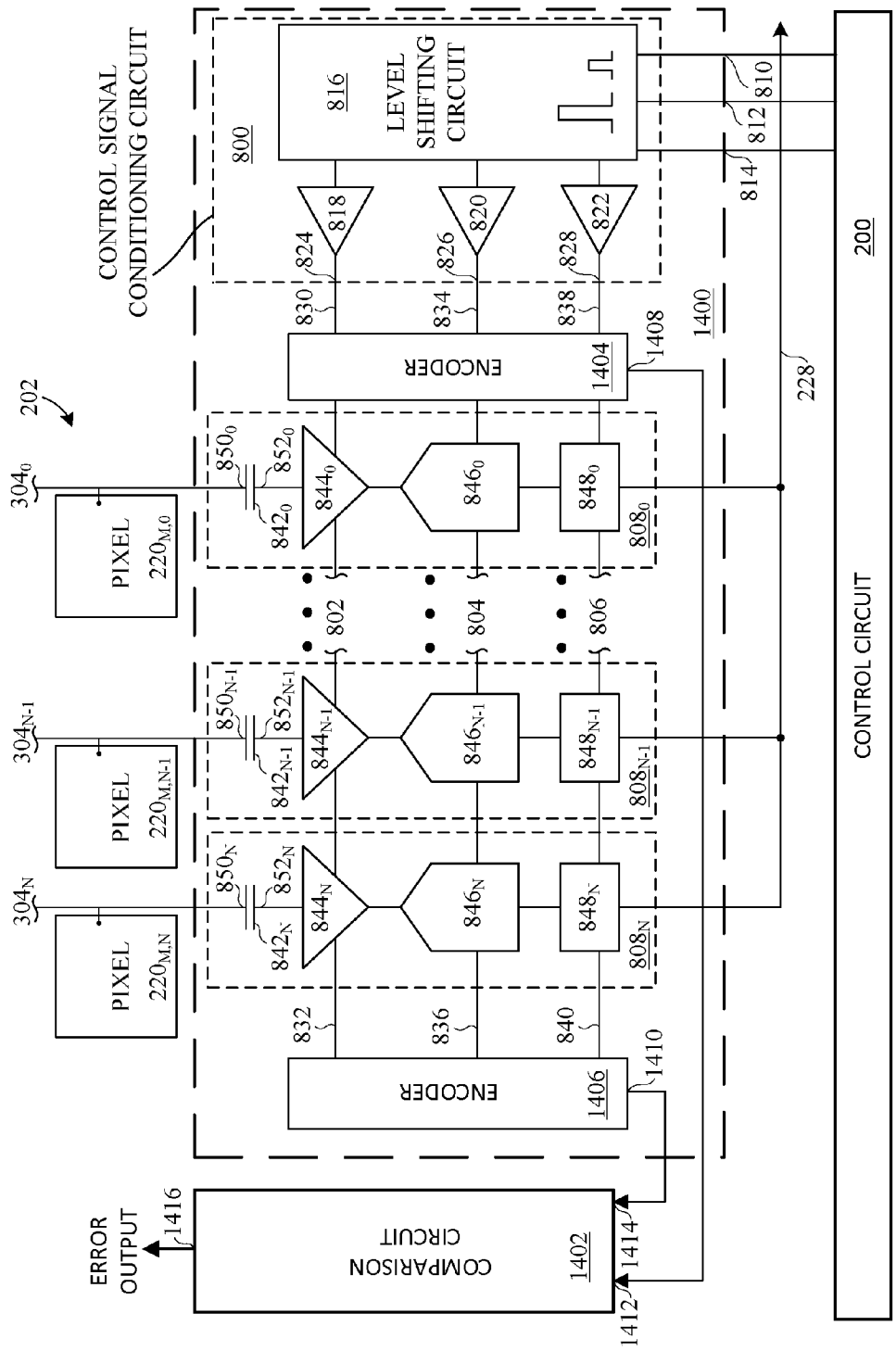
FIG. 14 is a circuit diagram of an alternate sampling circuit and an alternate comparison circuit according to yet another embodiment of the present invention.

FIG. 14 is a circuit diagram of an alternate sampling circuit 1400 and an alternate comparison circuit 1402 according to another embodiment of the present invention. It should be recognized that many of the features of sampling circuit 1400 are substantially similar to those of sampling circuit 212 and are, therefore, denoted by like reference numbers. Those substantially similar elements are not described again in detail to avoid redundancy.

In this particular embodiment, sampling circuit 1400 includes a first encoder 1404 and a second encoder 1406. First encoder 1404 is connected to first ends 830, 834, and 838 of control signal lines 802, 804, and 806, respectively, and is operative to encode control signals asserted thereon. First encoder 1404 includes an output terminal 1408 that is coupled to provide comparison circuit 1402 with encoded data indicative of control signals asserted on first ends 830, 834, and 838 of respective control signal lines 802, 804, and 806. Second encoder 1406 is connected to second ends 832, 836, and 840 of control signal lines 802, 804, and 806, respectively, and is operative to encode control signals asserted thereon. Second encoder 1406 also includes an output terminal 1410 that is coupled to provide comparison circuit 1402 with encoded data indicative of control signals asserted on second ends 832, 836, and 840 of respective control signal lines 802, 804, and 806.

Comparison circuit 1402 includes a first input terminal 1412, a second input terminal 1414, and an error signal output terminal 1416. First input terminal 1412 is connected to receive encoded data from output terminal 1408 of first encoder 1404. Second input terminal 1414 is connected to receive encoded data from output terminal 1410 of second encoder 1406.

During operation of sampling circuit 1400, first encoder 1404 and second encoder 1406 simultaneously encode control signals asserted on control signal lines 802, 804, and 806. More specifically, first encoder 1404 encodes the control signals from first ends 830, 834, and 838, and second encoder 1406 encodes the control signals from second ends 832, 836, and 840. Encoders 1404 and 1406 also simultaneously output the encoded data from output terminals 1408 and 1410, respectively. Input terminals 1412 and 1414 of comparison circuit 1402 simultaneously receive the encoded data output from terminal 1408 and 1410, respectively. Comparison circuit 1402 then determines if the encoded data received from input terminal 1412 corresponds with the encoded data received from input terminal 1414. If the encoded data received from input terminal 1412 does not properly correspond with the encoded data received from input terminal 1414, comparison circuit outputs an error signal from terminal 1416. The error signal indicates that the control signals asserted on control signal lines 802, 804, and 806 are not being properly distributed to all of pixel readout circuits $808_0$ through $808_N$.

The term "connected," as used herein, means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, data or other signal.

One or more embodiments include an article of manufacture (e.g., a computer program product) that includes a machine-accessible and/or machine-readable medium. The medium may include a mechanism that provides, for example stores, information in a form that is accessible and/or readable by the machine. The machine-accessible and/or machine-readable medium may provide, or have stored thereon, one or more or a sequence of instructions and/or data structures that if executed by a machine causes or results in the machine performing, and/or causes the machine to perform, one or more or a portion of the operations or methods or the techniques shown in the figures disclosed herein.

In one embodiment, the machine-readable medium may include a tangible nontransitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), aFlash memory, a phase-change memory, or a combinations thereof. The tangible medium may include one or more solid or tangible physical materials, such as, for example, a semiconductor material, a phase change material, a magnetic material, etc. Examples of suitable machines include, but are not limited to, digital cameras, digital video cameras, cellular telephones, computer systems, other electronic devices having pixel arrays, and other electronic devices capable of capturing images. Such electronic devices typically include one or more processors coupled with one or more other components, such as one or more storage devices (non-transitory machine-readable storage media). Thus, the storage device of a given electronic device may stores code and/or data for execution on the one or more processors of that electronic device. Alternatively, one or more parts of an embodiment may be implemented using different combinations of software, firmware, and/or hardware.

The description of particular embodiments of the present invention is now complete. Many of the described features may be substituted, altered or omitted without departing from the scope of the invention. For example, the inventive features can be applied to various image sensor types (e.g., front side illuminated sensors, backside illuminated sensors, etc.). As another example, many of the circuit components and configurations (e.g., logic gates, transistor types, switches, etc.) can be substituted with alternate circuit components and configurations that carry out substantially similar functions. These and other deviations from the particular embodiments shown will be apparent to those skilled in the art, particularly in view of the foregoing disclosure.

We claim:

1. A method for detecting defects in an image capture device, said method comprising:
   receiving a control signal;
   generating a drive signal based on said control signal;
   asserting said drive signal on a control line of said image capture device;
   comparing said asserted drive signal to said control signal; and
   generating an error signal if said control signal does not correspond to said asserted drive signal in a predetermined way.

2. The method of claim 1, wherein said step of asserting said drive signal on a control line of said image capture device includes asserting said drive signal on a row control line of an image sensor array.

3. The method of claim 1, wherein said step of asserting said drive signal on a control line of said image capture device includes asserting said drive signal on a control line of an image data sampling circuit.

4. The method of claim 1, wherein said step of comparing said asserted drive signal to said control signal includes:
   generating a second drive signal based on said control signal; and
   comparing said second drive signal to said drive signal.

5. The method of claim 1, wherein said step of comparing said asserted drive signal to said control signal includes:
   generating a first encoded value based on drive signals being asserted at a first point on a plurality of control lines;
   generating a second encoded value based on said drive signals at a second point on said plurality of control lines; and
   comparing said first encoded value to said second encoded value.

6. The method of claim 1, additionally comprising:
   receiving a second control signal;
   generating a second drive signal based on said second control signal;
   asserting said second drive signal on a second control line of said image capture device; and
   comparing inputs base on said second drive signal and said second control signal; and
   generating a second error signal if said second control signal does not correspond to said second drive signal in a predetermined way.

7. The method of claim 6, wherein;
   said image capture device additionally includes an image sensor array;
   said image capture device additionally includes an image data sampling circuit coupled to receive rows of data from said image sensor array;
   said drive signal is a row control drive signal in said image sensor array; and
   said second drive signal is a drive signal in said image data sampling circuit.

8. The method of claim 7, additionally comprising:
   periodically injecting test data into said image sensor array; and
   comparing said test data injected into said image sensor array with said test data received from said sensor array by said image data sampling circuit; and
   generating a third error signal if said test data injected into said image sensor array does not correspond in a predetermined way with said test data received from said sensor array by said image data sampling circuit.

9. An image capture device comprising:
   a controller operative to provide a control signal;
   a driver responsive to said control signal and operative to generate a drive signal based on said control signal and to assert said drive signal on a control line of said image capture device; and
   a comparator responsive to a first input based on said control signal and a second input based on said drive signal, said comparator being operative to generate an error signal if said control signal does not correspond to said asserted drive signal in a predetermined way.

10. The image capture device of claim 9, wherein said comparator directly compares said control signal to said drive signal to determine whether said drive signal corresponds to said control signal.

11. The image capture device of claim 9, wherein:
   said image capture device additionally includes an image sensor array; and
   said driver is a row control driver of said image sensor array.

12. The image capture device of claim 9, wherein;
   said image capture device additionally includes an image sensor array;
   said image capture device additionally includes an image data sampling circuit coupled to receive rows of data from said image sensor array; and said driver is a component of said image data sampling circuit.

13. The image capture device of claim 9, wherein:
said image capture device additionally includes a second driver coupled to receive said control signal and operative to generate a second drive signal based on said control signal; and
said comparator is operative to compare said second drive signal to said drive signal.

14. The image capture device of claim 9, additionally comprising:
a plurality of said control lines;
a first encoder coupled to said plurality of control lines at a first point and operative to generate a first encoded value based on drive signals detected on said control lines; and
a second encoder coupled to said plurality of control lines at a second point spaced apart from said first point, said second encoder operative to generate a second encoded value based on drive signals detected on said control lines; and wherein
said comparator is operative to compare said first encoded value to said second encoded value.

15. The image capture device of claim 9, additionally comprising:
a second driver responsive to a second control signal and operative to generate a second drive signal and to assert said second drive signal on a second control line of said image capture device; and
a second comparator responsive to a first input based on said second control signal and a second input based on said second drive signal, said second comparator being operative to generate a second error signal if said second control signal does not correspond to said second drive signal in a predetermined way.

16. The image capture device of claim 15, wherein;
said image capture device additionally includes an image sensor array;
said image capture device additionally includes an image data sampling circuit coupled to receive rows of data from said image sensor array;
said driver is a row control driver of said image sensor array; and
said second driver is a component of said image data sampling circuit.

17. The image capture device of claim 16, additionally comprising:
a test data injection circuit operative to periodically inject test data into said image sensor array; and
a third comparator operative to compare said test data injected into said image sensor array with said test data received from said sensor array by said image data sampling circuit, and to generate a third error signal if said test data injected into said image sensor array does not correspond in a predetermined way with said test data received from said sensor array by said image data sampling circuit.

18. An image capture device comprising:
a controller operative to provide a control signal;
a driver responsive to said control signal and operative to generate a drive signal based on said control signal and to assert said drive signal on a control line of said image capture device; and
means for comparing a first input based on said control signal and a second input based on said drive signal, and for generating an error signal if said control signal does not correspond to said asserted drive signal in a predetermined way.

* * * * *